United States Patent [19]

Mammano et al.

[11] Patent Number: 5,581,170

[45] Date of Patent: Dec. 3, 1996

[54] BATTERY PROTECTOR

[75] Inventors: Robert A. Mammano, Costa Mesa, Calif.; Larry Wofford, Cary, N.C.; Winthrop H. McClure, Londonderry, N.H.; Burt L. Price, Apex, N.C.

[73] Assignee: Unitrode Corporation, Merrimack, N.H.

[21] Appl. No.: 512,309

[22] Filed: Aug. 8, 1995

Related U.S. Application Data

[63] Continuation-in-part of Ser. No. 353,620, Dec. 12, 1994.
[51] Int. Cl.$^6$ ...................................................... H02J 7/00
[52] U.S. Cl. .................... 320/17; 320/5; 320/40; 320/48; 320/14
[58] Field of Search ......................... 320/48, 15, 17, 320/18, 25–26, 5–6, 2, 13, 14, 29, 30, 39, 40, 54, 55; 327/429, 419, 425, 427

[56] References Cited

U.S. PATENT DOCUMENTS

| | | | |
|---|---|---|---|
| 3,531,706 | 4/1967 | Mullersman | 320/20 |
| 3,543,043 | 11/1970 | Dunn | 307/18 |
| 3,576,487 | 4/1971 | Chase | 320/39 |
| 3,593,100 | 7/1971 | Foster et al. | 320/22 |
| 3,890,556 | 9/1973 | Melling et al. | 320/21 |
| 3,900,785 | 8/1975 | Alric et al. | 320/39 |
| 3,988,643 | 10/1974 | Morris | 317/33 VR |
| 4,021,717 | 5/1977 | Furuishi et al. | 320/39 |
| 4,061,955 | 12/1977 | Thomas et al. | 320/6 |
| 4,061,956 | 8/1976 | Brown et al. | 320/22 |
| 4,086,525 | 4/1978 | Ibsen et al. | 320/33 |

(List continued on next page.)

FOREIGN PATENT DOCUMENTS

| | | | |
|---|---|---|---|
| 0319020 | 6/1989 | European Pat. Off. | H02H 7/18 |
| 2547420 | 1/1968 | France . | |
| 2438149 | 2/1976 | Germany | H02H 7/18 |
| 3611484 | 10/1987 | Germany | H02H 7/18 |
| 3716069 | 12/1987 | Germany | H02H 7/18 |

| | | | |
|---|---|---|---|
| 0748589 | 7/1980 | U.S.S.R. | H01M 10/42 |

OTHER PUBLICATIONS

Soviet Inventions Illustrated data sheet, Derwent Publications LTD., Rochdale House, England, Feb. 3, 1982, pp. 12–13.

Soviet Inventions Illustrated data sheet, Derwent Publications LTD., Rochdale House, England, Aug. 8, 1984, p. 4.

K. V. Kordesch, Journal of Electrochemical Science and Technology, Technical Notes, Charging Method for Batteries Using the Resistance–free Voltage as Endpoint Indication, vol. 119, Aug. 1972, pp. 1053–1055.

TEMIC, Siliconix Si9717CY "Battery Disconnect Switch", data sheet, Rev. A, Jul. 4, 1994, pp. 1–3.

*Primary Examiner*—Peter S. Wong
*Assistant Examiner*—K. Shin
*Attorney, Agent, or Firm*—Weingarten, Schurgin, Gagnebin & Hayes

[57] ABSTRACT

A battery protector for providing overvoltage and undervoltage protection to one or more series-connected cells. The battery protector includes a voltage detection and comparison circuit, providing an overvoltage signal indicative of whether the voltage across any of the cells is greater than an overvoltage threshold level and an undervoltage signal indicative of whether the voltage across any of the cells is less than an undervoltage threshold level, and a switch connected in series with the current path between the cells and a charger and/or load. In one embodiment, the switch is a four-terminal FET and a bias control circuit is provided for selectively connecting the body region of the FET to ensure that current does not flow through the parasitic FET diodes. A second control circuit responsive to the overvoltage and undervoltage signals controls conduction of the switch, causing the switch to close if any of the following conditions occur: (1) the overvoltage and undervoltage signals do not indicate an overvoltage or undervoltage condition, respectively; (2) the overvoltage signal indicates an overvoltage condition, but the cells are attempting to discharge; or (3) the undervoltage signal indicates an undervoltage condition, but the charger is attempting to charge the cells.

20 Claims, 15 Drawing Sheets

U.S. PATENT DOCUMENTS

| | | | |
|---|---|---|---|
| 4,119,904 | 10/1978 | Haglund | 320/48 |
| 4,131,841 | 12/1978 | Bennefeld | 320/23 |
| 4,149,093 | 4/1979 | D'Alessio et al. | 307/10 BP |
| 4,160,941 | 7/1979 | Bennett | 320/56 |
| 4,194,146 | 3/1980 | Patry et al. | 320/44 |
| 4,223,232 | 9/1980 | Bulat | 320/9 X |
| 4,225,815 | 9/1980 | Lind et al. | 320/39 |
| 4,231,026 | 10/1980 | Sullivan | 340/636 |
| 4,237,385 | 12/1980 | Jurgens et al. | 307/66 |
| 4,238,721 | 12/1980 | DeLuca et al. | 320/18 |
| 4,247,811 | 1/1981 | Findl | 320/35 |
| 4,247,812 | 1/1981 | Patry et al. | 320/44 |
| 4,255,698 | 3/1981 | Simon | 320/35 |
| 4,260,910 | 4/1981 | Colman | 307/303 |
| 4,291,266 | 9/1981 | Portmann | 320/2 |
| 4,314,198 | 2/1982 | Rogers | 323/351 |
| 4,328,457 | 5/1982 | Higuchi | 320/36 |
| 4,341,988 | 7/1982 | Small | 320/31 |
| 4,346,336 | 8/1982 | Crawford | 320/9 |
| 4,370,606 | 1/1983 | Kakumoto et al. | 320/35 |
| 4,394,741 | 7/1983 | Lowndes | 364/483 |
| 4,396,880 | 8/1983 | Windebank | 320/21 |
| 4,424,476 | 1/1984 | Mullersman | 320/36 |
| 4,433,278 | 2/1984 | Lowndes et al. | 320/48 |
| 4,467,266 | 8/1984 | Ritchie | 320/40 |
| 4,479,083 | 10/1984 | Sullivan | 320/6 |
| 4,484,130 | 11/1984 | Lowndes et al. | 320/40 |
| 4,487,458 | 12/1984 | Janutka | 307/577 |
| 4,495,536 | 1/1985 | Bynum | 361/91 |
| 4,513,341 | 4/1985 | Kollanyi | 361/91 |
| 4,516,168 | 5/1985 | Hicks | 358/190 |
| 4,521,735 | 6/1985 | Kageyama et al. | 324/433 |
| 4,547,770 | 10/1985 | Suzuki et al. | 340/636 |
| 4,553,081 | 11/1985 | Koenck | 320/43 |
| 4,554,500 | 12/1985 | Sokira | 320/31 |
| 4,562,398 | 12/1985 | Kotlarewsky | 320/31 |
| 4,571,531 | 2/1986 | Lin | 320/2 |
| 4,583,035 | 4/1986 | Sloan | 320/22 |
| 4,622,508 | 11/1986 | Matteau et al. | 320/13 |
| 4,633,418 | 12/1986 | Bishop | 364/554 |
| 4,649,333 | 3/1987 | Moore | 320/31 |
| 4,658,199 | 4/1987 | Hoffman | 320/21 |
| 4,668,901 | 5/1987 | Furukawa | 320/31 |
| 4,670,703 | 6/1987 | Williams | 320/22 |
| 4,684,871 | 8/1987 | Plagge | 320/21 |
| 4,709,202 | 11/1987 | Koenck et al. | 320/43 |
| 4,710,694 | 12/1987 | Sutphin et al. | 320/21 |
| 4,712,055 | 12/1987 | Houser, Jr. | 320/35 |
| 4,713,555 | 12/1987 | Lee | 307/66 |
| 4,716,353 | 12/1987 | Engelmann | 320/21 |
| 4,716,354 | 12/1987 | Hacker | 320/39 |
| 4,722,059 | 1/1988 | Engel et al. | 364/483 |
| 4,731,573 | 3/1988 | Sexton et al. | 320/14 |
| 4,746,852 | 5/1988 | Martin | 320/20 |
| 4,777,424 | 10/1988 | Sakamura et al. | 320/21 |
| 4,785,229 | 11/1988 | Edwards | 323/284 |
| 4,792,743 | 12/1988 | Tsujino et al. | 320/15 |
| 4,857,985 | 8/1989 | Miller | 357/42 |
| 4,868,706 | 9/1989 | Zaderej | 361/101 |
| 4,871,956 | 10/1989 | Barrella | 320/13 |
| 4,897,591 | 1/1990 | Spani | 320/32 |
| 4,918,368 | 4/1990 | Baker et al. | 320/40 |
| 4,949,028 | 8/1990 | Brune | 320/6 |
| 4,956,597 | 9/1990 | Heavey et al. | 320/14 |
| 4,969,062 | 11/1990 | Barylak et al. | 361/42 |
| 4,977,364 | 12/1990 | Kordesch et al. | 320/21 |
| 4,992,951 | 2/1991 | Glowczewski et al. | 364/483 |
| 4,998,057 | 3/1991 | Shinohara et al. | 320/40 |
| 5,028,858 | 7/1991 | Schnizler et al. | 320/2 |
| 5,028,860 | 7/1991 | Amano | 320/23 |
| 5,055,763 | 10/1991 | Johnson et al. | 320/15 |
| 5,105,328 | 4/1992 | Schoofs | 361/91 |
| 5,111,353 | 5/1992 | Kotowski et al. | 361/91 |
| 5,119,265 | 6/1992 | Qualich et al. | 361/103 |
| 5,130,883 | 7/1992 | Edwards | 361/91 |
| 5,138,246 | 7/1992 | Kobayashi | 320/13 |
| 5,142,215 | 8/1992 | Mathison | 320/40 |
| 5,153,496 | 10/1992 | LaForge | 320/17 |
| 5,154,989 | 10/1992 | Howard et al. | 429/160 |
| 5,155,428 | 10/1992 | Kang | 320/13 |
| 5,168,205 | 12/1992 | Kan et al. | 320/22 |
| 5,172,044 | 12/1992 | Sasaki et al. | 320/22 |
| 5,175,485 | 12/1992 | Joo | 320/32 |
| 5,177,371 | 1/1993 | Faulk | 307/66 |
| 5,177,426 | 1/1993 | Nakanishi et al. | 320/13 |
| 5,179,335 | 1/1993 | Nor | 320/21 |
| 5,179,337 | 1/1993 | Staarman et al. | 320/13 |
| 5,180,645 | 1/1993 | Moré | 429/127 |
| 5,202,811 | 4/1993 | Minks | 361/56 |
| 5,204,611 | 4/1993 | Nor et al. | 320/21 |
| 5,206,578 | 4/1993 | Nor | 320/14 |
| 5,214,369 | 5/1993 | McCrea | 320/21 |
| 5,218,284 | 6/1993 | Burns et al. | 320/14 |
| 5,237,259 | 8/1993 | Sanpei | 320/23 |
| 5,243,269 | 9/1993 | Katayama et al. | 320/14 |
| 5,244,757 | 9/1993 | Takami et al. | 429/194 |
| 5,252,411 | 10/1993 | Yokokawa et al. | 429/62 |
| 5,264,777 | 11/1993 | Smead | 320/6 |
| 5,274,319 | 12/1993 | Keener et al. | 320/2 |
| 5,274,321 | 12/1993 | Matsunda | 320/31 |
| 5,278,000 | 1/1994 | Huang et al. | 429/91 |
| 5,280,230 | 1/1994 | Mahoney | 320/14 |
| 5,287,286 | 2/1994 | Ninomiya | 364/481 |
| 5,296,997 | 3/1994 | Betton et al. | 320/13 |
| 5,304,914 | 4/1994 | Feldstein | 320/3 |
| 5,304,915 | 4/1994 | Sanpei et al. | 320/14 |
| 5,343,137 | 8/1994 | Kitaoka et al. | 320/13 |
| 5,343,138 | 8/1994 | Ainsworth | 320/14 |
| 5,343,380 | 8/1994 | Champlin | 363/46 |
| 5,349,280 | 9/1994 | Kim | 320/13 |
| 5,349,282 | 9/1994 | McClure | 320/32 |
| 5,469,042 | 11/1995 | Ruhling | 320/17 |
| 5,493,197 | 2/1996 | Eguchi et al. | 320/5 |

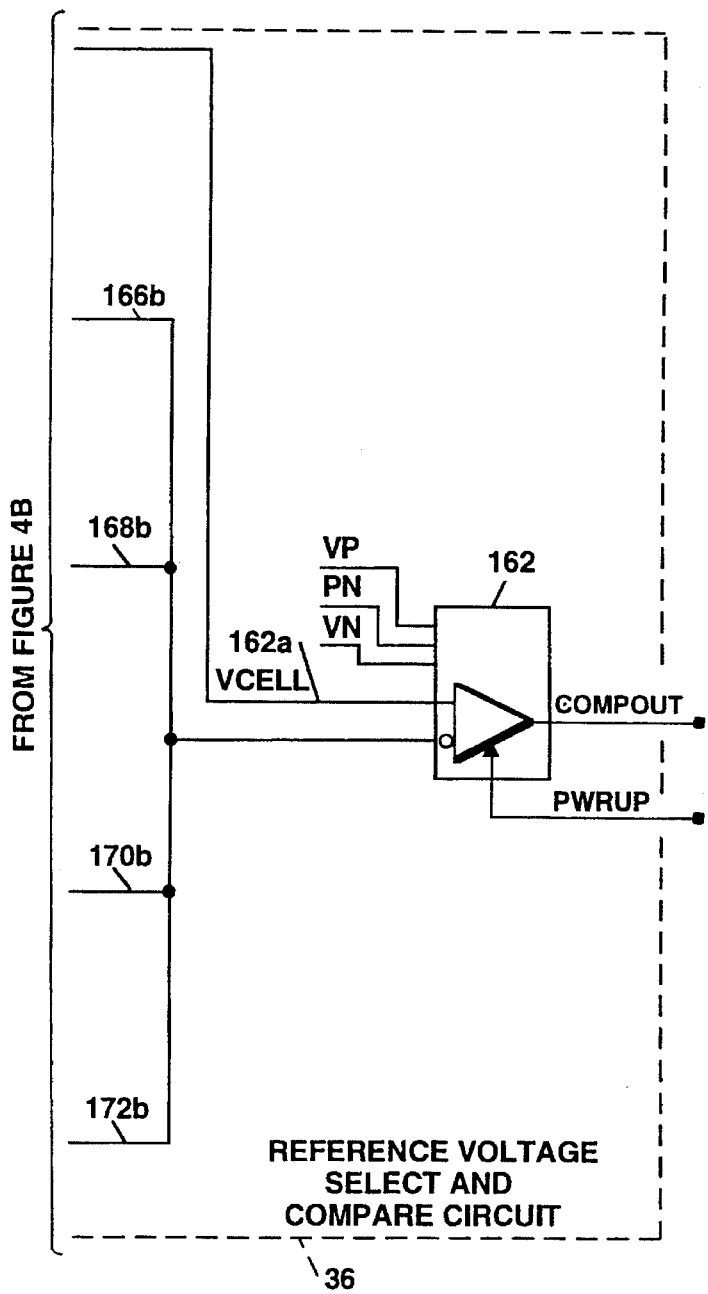
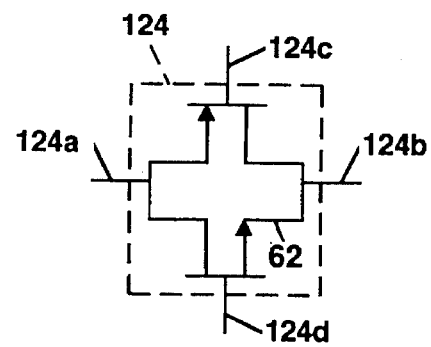
*FIGURE 4D*
*FIGURE 4C*

BATTERY PROTECTOR

RELATED CASE INFORMATION

This application is a continuation-in-part application of a co-pending U.S. patent application entitled BATTERY CHARGER/MONITOR EMPLOYING A CELL VOLTAGE SENSOR, Ser. No. 08/353,620, filed on Dec. 12, 1994.

FIELD OF THE INVENTION

This invention relates generally battery protection circuits and, more particularly, to a circuit for protecting battery cells from overvoltage and/or undervoltage conditions.

BACKGROUND OF THE INVENTION

As is known in the field of rechargeable batteries, overcharging a battery may result in a detrimental overvoltage condition. Additionally, in certain battery types, overdischarging the battery may result in a detrimental undervoltage condition. Circuits for protecting battery cells from potentially damaging overvoltage and/or undervoltage conditions are known. Such circuits measure the voltage across one or more cells and terminate the charging and/or discharging of the cells in response to the cell voltage exceeding a predetermined level or falling below a predetermined level, respectively.

One such circuit is described in U.S. Pat. No. 5,304,915 to Sanpei et al. The Sanpei et al. circuit utilizes a pair of N-channel Field Effect Transistors (FETs) connected in series, with interconnected drain electrodes, for protecting two series-connected cells. When an overvoltage condition is detected, one of the FETs turns off to prevent a charge current from flowing to the cells; whereas, when an undervoltage condition is detected, the other FET turns off to prevent a discharge current from flowing from the cells. When either FET is turned off, current flow through the cells in the opposite direction is permitted, thereby permitting the cells to be charged when an undervoltage condition is sensed and permitting the cells to be discharged when an overvoltage condition is sensed. More particularly, when an undervoltage condition is sensed, charge current is permitted to flow through the conducting FET and a parasitic diode of the non-conducting FET. Under normal operating conditions (i.e., the absence of an overvoltage or undervoltage condition) the charge or discharge current flows through both of the series-connected FETs.

SUMMARY OF THE INVENTION

In accordance with the present invention, a battery protection integrated circuit for protecting one or more series-connected battery cells includes a voltage detection and comparison circuit having a plurality of input terminals adapted for coupling across the cells and a current carrying switch positioned in series with the current path between the cells and a battery charger and/or load to control both charge and discharge current. The voltage detection and comparison circuit generates an overvoltage signal indicative of whether or not the voltage across any of the cells is greater than an overvoltage threshold level and/or an undervoltage signal indicative of whether or not the voltage across any of the cells is less than an undervoltage threshold level. The current carrying switch has a first terminal adapted for coupling to the cells, a second terminal adapted for coupling to the charger and/or load, an activation terminal responsive to the overvoltage and/or undervoltage signals, and a back gate terminal formed by the semiconductor substrate of the integrated circuit battery protector. The substrate is adapted for selective connection to the most negative circuit potential which, in this case, is the first or second switch terminal depending on the direction of current flow. In one embodiment, the current carrying switch is a four-terminal FET and the activation terminal is a gate terminal.

Use of the single, current carrying switch in the battery protector integrated circuit, or chip of the present invention may minimize losses, as compared to the use of two series-connected FETs as in U.S. Pat. No. 5,304,915 described above. This is because the charge and load current flows through only one FET. Alternatively, for the same losses, the current carrying FET of the present invention may be made smaller, thereby advantageously occupying less integrated circuit area. Additionally, the use of a single current carrying device formed on the same integrated circuit as the remainder of the battery protector can reduce circuit cost and size by eliminating the additional area and other packaging considerations associated with the use of one or more discrete current carrying devices.

A bias control circuit, including first and second switches, controls the connection of the chip substrate to either the first or second terminal of the current carrying switch. The first bias control switch is coupled between the first terminal of the current carrying switch and the chip substrate and the second bias control switch is coupled between the second terminal of the current carrying switch and the chip substrate. The chip substrate is connected to either the first or second terminal by selective alternate opening and closing of the bias control switches, so that when one of the bias control switches is closed the other is open.

The selective connection of the chip substrate ensures that current does not flow through the body, or parasitic diodes of the FET switch (i.e., inherent FET diodes connected between the body region, or chip substrate and the source and drain terminals of the FET, respectively). In this way, injection of minority carriers into the chip substrate is prevented, thereby reducing the tendency of the battery protection chip toward a potentially damaging latch-up condition.

Also provided is a gate control circuit coupled between the voltage detection and comparison circuit and the activation, or gate terminal of the current carrying switch. The gate control circuit is responsive to the overvoltage and undervoltage signals and the polarity of the voltage across the current carrying switch for controlling the position, or conduction of the current carrying switch. The gate control circuit may be further responsive to additional signals, such as a short circuit protection signal, a thermal shutdown signal and a low power signal.

When the current carrying switch is closed (i.e., conducts), current is permitted to flow from the charger to the cells or from the cells to the load; whereas, when the current carrying switch is open, the cells can be neither charged nor discharged. More particularly, the gate control circuit is adapted for closing the current carrying switch to interconnect the first and second terminals thereof when any of the following conditions occurs: (1) the overvoltage and undervoltage signals do not indicate an overvoltage or undervoltage condition, respectively; (2) the overvoltage signal indicates an overvoltage condition, but the cells are attempting to discharge; or (3) the undervoltage signal indicates an undervoltage condition, but the charger is attempting to charge the cells.

With this arrangement, the current carrying switch permits load current to flow from the cells to the load or charge current to flow from the charger to the cells as long neither an overvoltage nor an undervoltage condition exists. Additionally, load current is permitted to flow to the load even during an overvoltage condition, as long as the voltage across the current carrying switch indicates that the cells are attempting to discharge. Similarly, charge current is permitted to flow to the cells even during an undervoltage condition, as long as the voltage across the current carrying switch indicates that the charger is attempting to charge the cells. In this way, even in the event of an overvoltage or undervoltage condition, the cells are permitted to discharge or charge, respectively, as long as the polarity of the voltage across the current carrying switch indicates that the cells are trying to discharge or charge, respectively.

Various embodiments of the cell voltage detection and comparison circuit are described. In one embodiment, the circuit includes a first multiplexer for selecting the voltage across one of the cells for processing and a second multiplexer for selecting a threshold voltage for comparison to the selected cell voltage. Also provided is a comparator for comparing the selected cell voltage to the selected threshold voltage and a state machine for storing the results of such comparisons in order to provide the overvoltage and undervoltage signals.

More particularly, a selected cell voltage is compared to a first threshold voltage and subsequently to a second threshold voltage. Thereafter, a previously non-selected cell is selected and its voltage compared to the first threshold voltage and subsequently to the second threshold voltage. If the voltage across any of the cells is greater than the first threshold voltage, then an overvoltage condition is indicated and if the voltage across any of the cells is less than the second threshold voltage, then an undervoltage condition is indicated. The state machine maintains the overvoltage signal in the logic state indicative of an overvoltage condition until the voltage across each of the cells falls below a third predetermined threshold level and maintains the undervoltage signal in the logic state indicative of an undervoltage condition until the voltage across each of the cells exceeds a fourth predetermined threshold level.

Another embodiment of the voltage detection and comparison circuit includes a level shifter for shifting the level of the voltage across one or more of the cells, so that the voltage across each of the cells is referenced to the same potential. For example, in the case where the battery protector is connected to two series-connected cells, the voltage across an upper cell is shifted by the level shifter to provide a level shifted voltage referenced to the same potential as the voltage across the lower cell. Also provided is a comparator circuit connected to the level shifter for comparing the level shifted cell voltage and the non-shifted cell voltage to a first threshold level in order to provide corresponding intermediate overvoltage signals and for comparing the level shifted cell voltage and the non-shifted cell voltage to a second threshold level to provide corresponding intermediate undervoltage signals. A latch circuit generates the overvoltage signal in response to the intermediate overvoltage signals and maintains the overvoltage signal in the logic state representative of an overvoltage condition until the voltage across each of the cells is less than a third threshold level. The latch circuit further generates the undervoltage signal in response to the intermediate undervoltage signals and maintains the undervoltage signal in the logic state indicative of an undervoltage condition until the voltage across each of the cells is greater than a fourth threshold level.

A further alternate embodiment of the cell voltage detection and comparison circuit includes a plurality of differential amplifiers, each one having a pair of input terminals coupled across a corresponding cell and an output terminal, and a diode network coupled to the output terminal of each differential amplifier for providing a high cell voltage signal proportional to the highest voltage across any of the cells and a low cell voltage signal proportional to the lowest voltage across any of the cells. The circuit further includes a comparator for comparing the high cell voltage signal to the first threshold voltage and a comparator for comparing the low cell voltage signal to the second threshold voltage. Also provided is a hysteresis comparator for comparing the high cell voltage signal to the third threshold voltage and a hysteresis comparator for comparing the low cell voltage signal to the fourth threshold voltage. A first latch which generates the overvoltage signal is set when the high cell voltage signal exceeds the first threshold voltage and is not reset until the voltage across all of the cells falls below the third threshold level. A second latch which generates the undervoltage signal is set when the low cell voltage signal falls below the second threshold level and is not reset until the voltage across all of the cells exceeds the fourth threshold level.

BRIEF DESCRIPTION OF THE DRAWINGS

The foregoing features of this invention, as well as the invention itself, may be more fully understood from the following detailed description of the drawings in which:

FIG. 4C is a schematic of the remaining part of the reference voltage select and compare circuit;

FIG. 4D is a schematic of an illustrative switch of the cell voltage select circuit of FIG. 4;

DESCRIPTION OF THE PREFERRED EMBODIMENT

Figure 1:
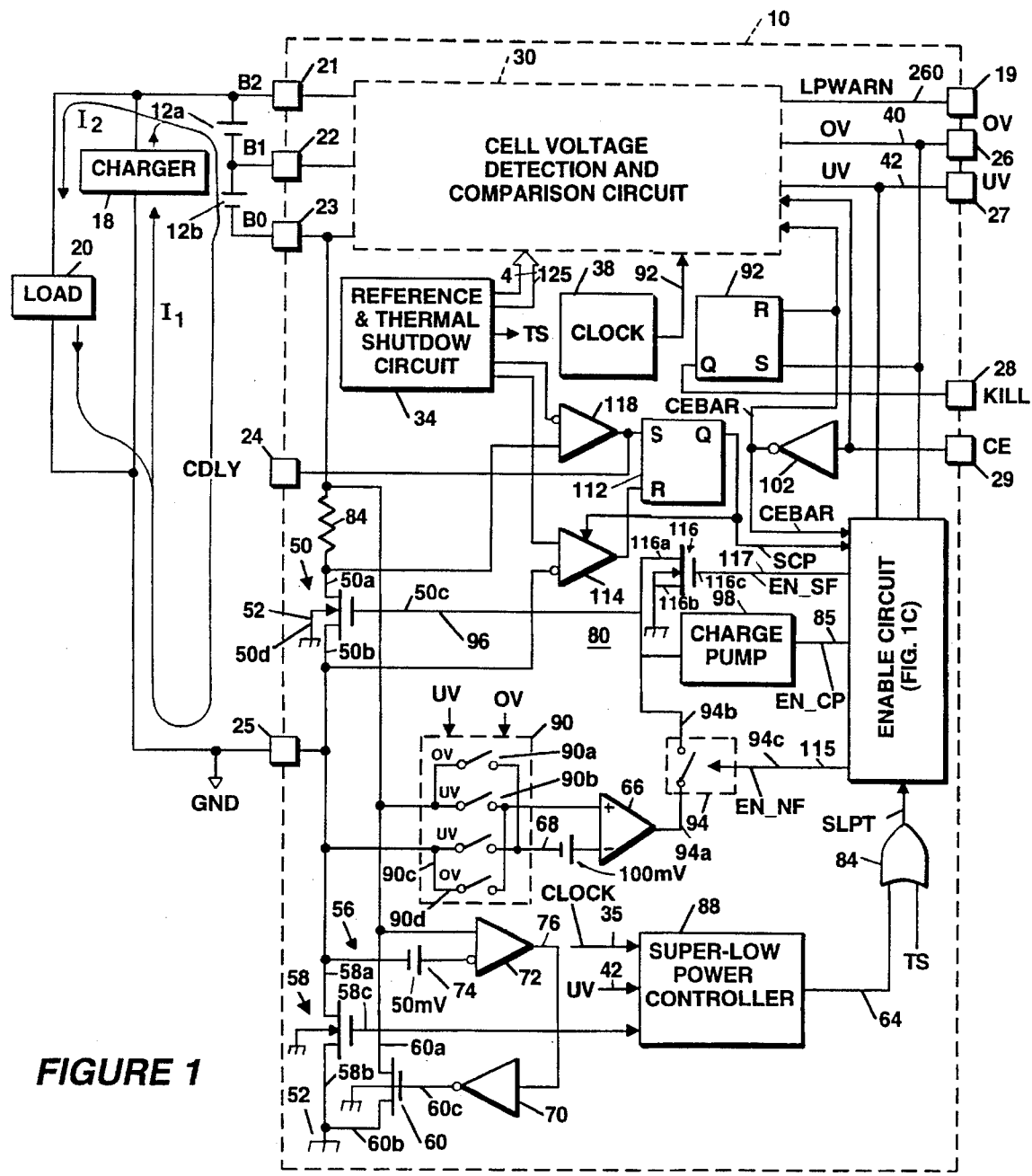
FIG. 1 is a schematic of a battery protector in accordance with the invention.

Referring to FIG. 1, a battery protector 10 is shown in connection with a plurality of series-connected battery cells 12a, 12b, a battery charger 18, and a load 20. The battery protector 10 is preferably an integrated circuit, or chip, having pins, or pads 19 and 21–29, as shown. Additional pins (not shown) may be provided for permitting access to various internal nodes of the chip 10. Pins 21, 22 and 23 are adapted for connection to terminals of cells 12a, 12b and pin 25 is adapted for connection to a reference potential, such as ground, to which the charger 18 and load 20 are also connected, as shown. Although the battery protector 10 is shown to be connected to two cells 12a, 12b, it will be appreciated that, in general, the battery protector 10 can be readily modified to accommodate connection to one or more cells. The battery protector 10 will be described herein in conjunction with the two illustrative cells 12a, 12b for simplicity.

The battery protector 10 includes a cell voltage detection and comparison circuit 30. The circuit 30 is responsive to the voltage across the cells 12a, 12b and one or more reference voltages 125 generated by a reference and thermal shutdown circuit 34, for providing an overvoltage signal 40 indicative of whether or not the voltage across any of the cells 12a, 12b is greater than a predetermined overvoltage threshold level and an undervoltage signal 42 indicative of whether or not the voltage across any of the cells 12a, 12b is less than a predetermined undervoltage threshold level. Various embodiments of the cell voltage detection and comparison circuit 30 are suitable for use in the battery protector 10, three of which are shown and described in conjunction with FIGS. 3–8 below. The circuit 30 also provides an LPWARN signal 260 to chip pin 19 to indicate a low battery voltage condition, as will be described.

A current carrying switch 50 is connected in series with the current path between the cells 12a, 12b and the load 20 and charger 18. More specifically, the switch 50 is in series with a first current path carrying a charge current $I_1$ from the charger 18 to the cells 12a, 12b and with a second current path carrying a load current $I_2$ from the cells 12a, 12b to the load 20. Switch 50 has a first terminal 50a connected to chip pin 23 via a current sense resistor 84, a second terminal 50b connected to pin 25, an activation terminal 50c responsive to a gate drive signal 96 and a back gate terminal, or body diode terminal 50d formed by the substrate 52 of the integrated circuit. The back gate terminal 50d forms the anodes of two parasitic body diodes, as described below. The back gate terminal 50d and chip substrate 52 are selectively connectable to either the first switch terminal 50a or to the second switch terminal 50b, as will be described.

In one embodiment, current carrying switch 50 is a four-terminal N-channel FET, with the activation terminal 50c providing the gate terminal and the back gate terminal 50d formed by the substrate 52 of the battery protector semiconductor chip. When the chip substrate 52 and the body gate terminal 50d are connected to the first switch terminal 50a, terminal 50a operates as the source terminal of the FET 50 and the second terminal 50b operates as the drain terminal of the FET 50. Alternatively, when the chip substrate 52 and the body gate terminal 50d are connected to the second terminal 50b, terminal 50a operates as the drain terminal of the FET 50 and terminal 50b operates as the source terminal.

A bias control circuit 56 is provided for selectively connecting the chip substrate 52 to the first or second switch terminal 50a, 50b, respectively, depending on the direction of current flow through the FET 50, so that the chip substrate 52 is always connected to the most negative potential. The bias control circuit 56 includes a first bias control switch 58 and a second bias control switch 60, both of which are N-channel FETs in the illustrative embodiment. Bias control FET 58 has a drain terminal 58a connected to the second terminal 50b of the current carrying FET 50 and a source terminal 58b connected to the chip substrate 52. A comparator 72 provides a gate drive signal 76 to a gate terminal 58c of FET 58. The second bias control FET 60 has a drain terminal 60a coupled to the first terminal 50a of the current carrying FET 50 through resistor 84, a source terminal 60b connected to the chip substrate 52 and a gate terminal 60c connected to the output terminal of an inverter 70. Inverter 70 inverts the output signal 76 of comparator 72, as shown.

The output signal 76 of comparator 72 is indicative of whether or not a charge current $I_1$ is flowing or trying to flow from the charger 18 to the cells 12a, 12b. More particularly, comparator 72 has a non-inverting input terminal connected to the first terminal 50a of FET 50 via resistor 84 (i.e., to pin 23) and an inverting input terminal connected to the second terminal 50b of FET 50 via an offset voltage 74, such as fifty millivolts. The output signal 76 of comparator 72 is at a logic high level when the charger 18 is charging or attempting to charge cells 12a, 12b.

Figure 1A:
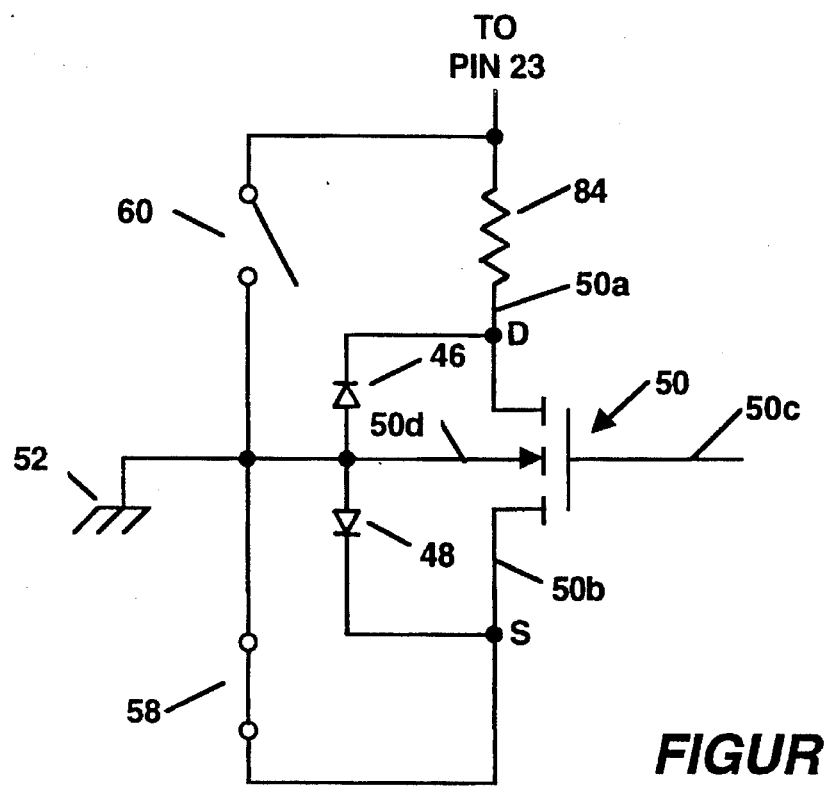
FIG. 1A is a schematic of a portion of the battery protector of FIG. 1 showing a first set of bias switch positions.
Figure 1B:
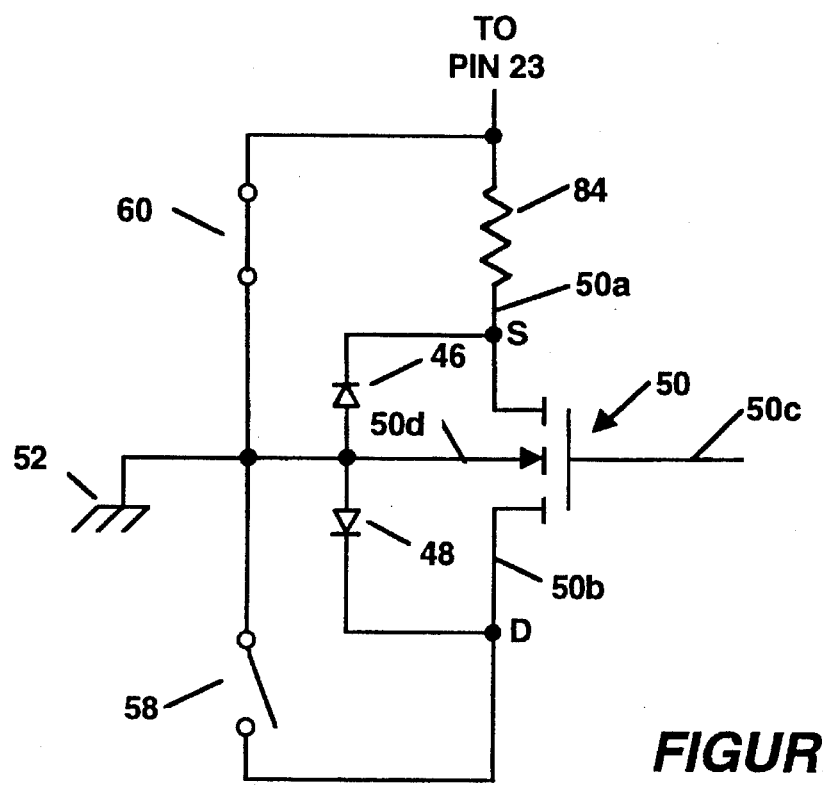
FIG. 1B is a schematic of a portion of the battery protector of FIG. 1 showing a second set of bias switch positions.

Referring also to FIGS. 1A and 1B, the current carrying FET 50 is shown to have two parasitic body diodes 46, 48. FET switches 58, 60 are shown in FIGS. 1A and 1B as mechanical switches for simplicity. It will be appreciated that a closed switch corresponds to a conducting FET and an open switch corresponds to a non-conducting FET. A first body diode 46 has an anode formed by the chip substrate 52 and the cathode of diode 46 is connected to the first terminal 50a of FET 50 and to the current sense resistor 84. A second body diode 48 of switch 50 has an anode formed by the chip substrate 52 and a cathode connected to the second terminal 50b of FET 50, as shown.

When charge current flows or is attempting to flow to the cells 12a, 12b from the charger 18, switches 58, 60 are positioned as shown in FIG. 1A. Under this condition, comparator 72 detects that the voltage at pin 23 is greater than the voltage at FET terminal 50b, thereby causing the logic output signal 76 to be high. A logic high signal 76 causes switch 58 to close and switch 60 to open, as shown in FIG. 1A. With the chip substrate 52 connected to switch terminal 50b via closed switch 58, as shown in FIG. 1A, switch terminal 50a operates as the drain terminal of FET 50 and switch terminal 50b operates as the source terminal of FET 50.

When discharge current flows or attempts to flow from cells 12a, 12b to load 20, switches 58, 60 are positioned as shown in FIG. 1B. Under this operating condition, the voltage at pin 23 is less than the voltage at switch terminal 50b, thereby causing the logic output signal 76 to be low. A low logic signal 76 in turn causes switch 58 to open and switch 60 to close, as shown. With this arrangement, the chip substrate 52 is connected to switch terminal 50a via closed switch 60 and resistor 84, thereby causing switch terminal 50a to operate as the source terminal of FET 50 and switch terminal 50b to operate as the drain terminal of FET 50.

The selective positioning of switches 58, 60 in the above-described manner ensures that under no operating conditions does current flow through either of the body diodes 46, 48 of current carrying FET 50. This is because, when switches 58, 60 are positioned as shown in FIG. 1A, body diode 46 is reverse-biased and body diode 48 is shorted by closed switch 58. Conversely, when switches 58, 60 are positioned as shown in FIG. 1B, body diode 46 is shorted by closed switch 60 and body diode 48 is reverse-biased. With this arrangement, the chip substrate 52 is connected to whichever FET terminal 50a, 50b is at a lower potential, thereby preventing current from flowing through the body diodes 46, 48 under any operating conditions. By selectively connecting the chip substrate 52 in the manner described above, the tendency of the chip 10 toward a potentially damaging latch-up condition is reduced. That is, since current is prevented from flowing through the body diodes 46, 48, the injection of minority carriers into the chip substrate region 52, a condition that may lead to latch-up, is prevented.

Referring again to FIG. 1, a gate control circuit 80 generates a gate drive signal 96 for application to terminal 50c of the current carrying FET 50 in response to the overvoltage signal 40, the undervoltage signal 42 and the polarity of the voltage across the current carrying FET 50 as determined by a switch network 90. In the illustrative embodiment, the gate control circuit 80 is additionally responsive to an Super Low Power/Temperature (SLPT) signal, a Short Circuit Protection (SCP) signal, and an inverted version of a Chip Enable signal (i.e., the CEBAR signal). The SCP signal is at a logic high level in the event of a short circuit condition across the battery pack (i.e., across pins 21 and 25). The SLPT signal implements a power conservation feature and a temperature monitoring feature and the CEBAR signal is associated with a chip enable feature of the battery protector 10, as will be described.

In accordance with the power conservation feature of the battery protector circuit 10, a super-low power controller 88 is provided. The controller 88 is responsive to a clock signal 35 provided by the clock signal generator 38, the undervoltage signal 42 and the output signal 76 of comparator 72. In operation, when the voltage across either of the cells 12a, 12b is indicative of an undervoltage condition and the polarity of the voltage across FET terminals 50a and 50b indicates that the load 20 is attempting to discharge the cells 12a, 12b, then, upon the rising edge of the next clock cycle, a low power mode of operation is initiated by a low power signal 64 transitioning to a logic high state. During low power operation, much of the circuitry on the chip 10, including the clock signal generator 38, enters low power consumption operation, in which battery power is conserved, since the cells 12a, 12b power the battery protector circuitry.

An OR gate 84 is responsive to the low power signal 64 and to a Thermal Shutdown (TS) signal generated by the reference and thermal shutdown circuit 34 for providing the SLPT signal to an enable circuit 82. Whenever either the battery protector 10 is in the low power mode of operation or the temperature of the battery protector chip 10 is at an unacceptable level, the SLPT signal is at a logic high level.

A chip enable (CE) pin 29 permits operation of the battery protector 10 to be terminated by pulling pin 29 to ground. Generally, the chip enable pin 29 will be accessible only during manufacture, when it may be advantageous to disable the chip in order to ensure that a "kill" feature of the battery protector (described below) is not falsely activated. The chip enable (CE) signal is coupled to the cell voltage detection and comparison circuit 30 and to an inverter 102. The output of inverter 102 provides the CEBAR signal which is coupled to the enable circuit 82 and also to circuit 30, as shown.

The switch network 90 includes four individual switches 90a–90d coupled between chip pin 23 and the second terminal 50b of the FET 50. Switches 90a and 90d are controlled in response to the overvoltage signal 40 and switches 90b and 90c are controlled in response to the undervoltage signal 42. The first switch 90a is coupled between pin 23 and an offset voltage 68 which is further coupled to the inverting input terminal of a linear amplifier 66. A second switch 90b of the network 90 is coupled between pin 23 and the non-inverting input terminal of amplifier 66. A third switch 90c of the network 90 is coupled between FET terminal 50b and the offset voltage 68 and the last switch 90d is coupled between switch terminal 50b and the non-inverting input terminal of the amplifier 66.

Figure 1C:
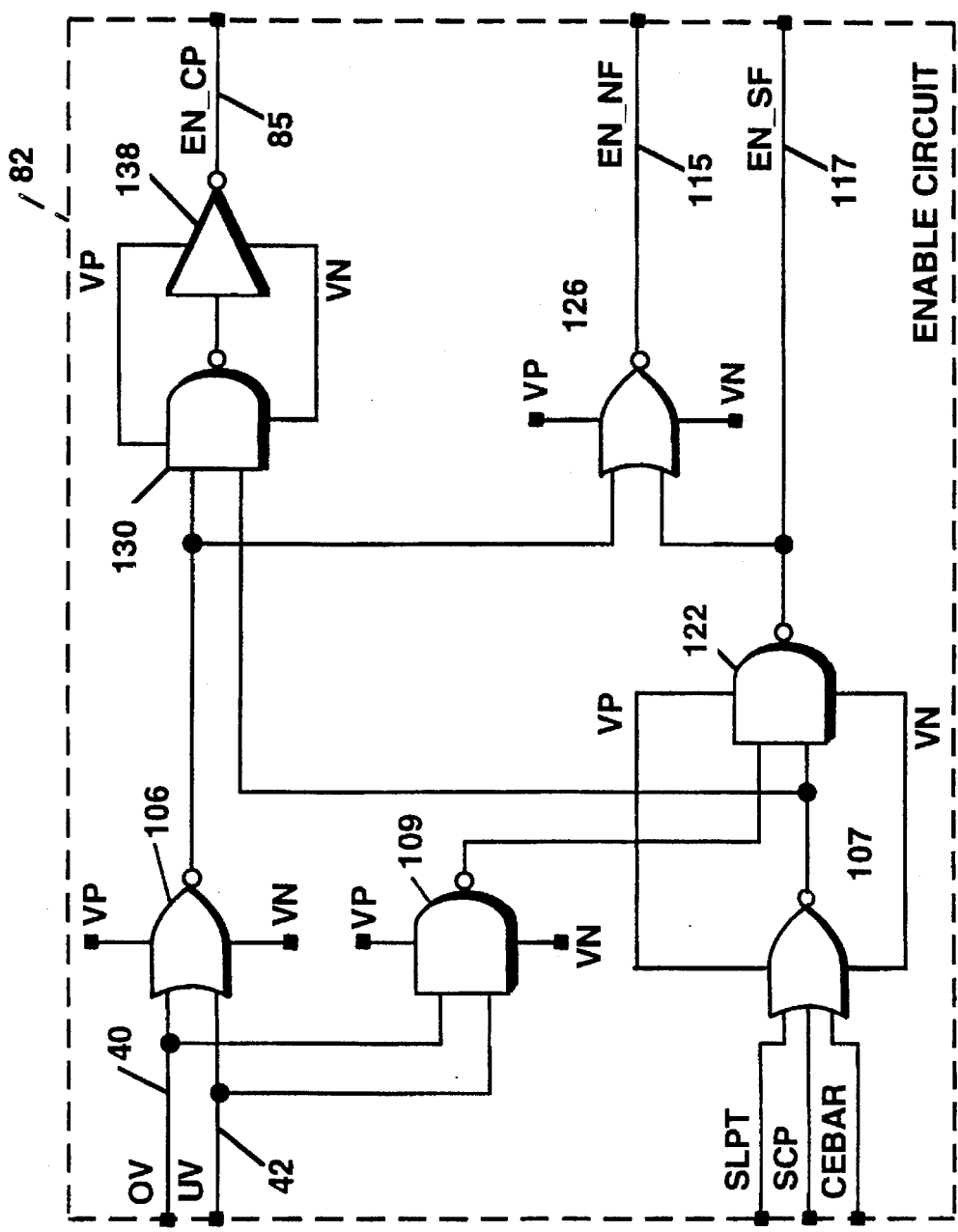
FIG. 1C is a schematic of the enable circuit of the battery protector of FIG. 1.
Figure 1D:
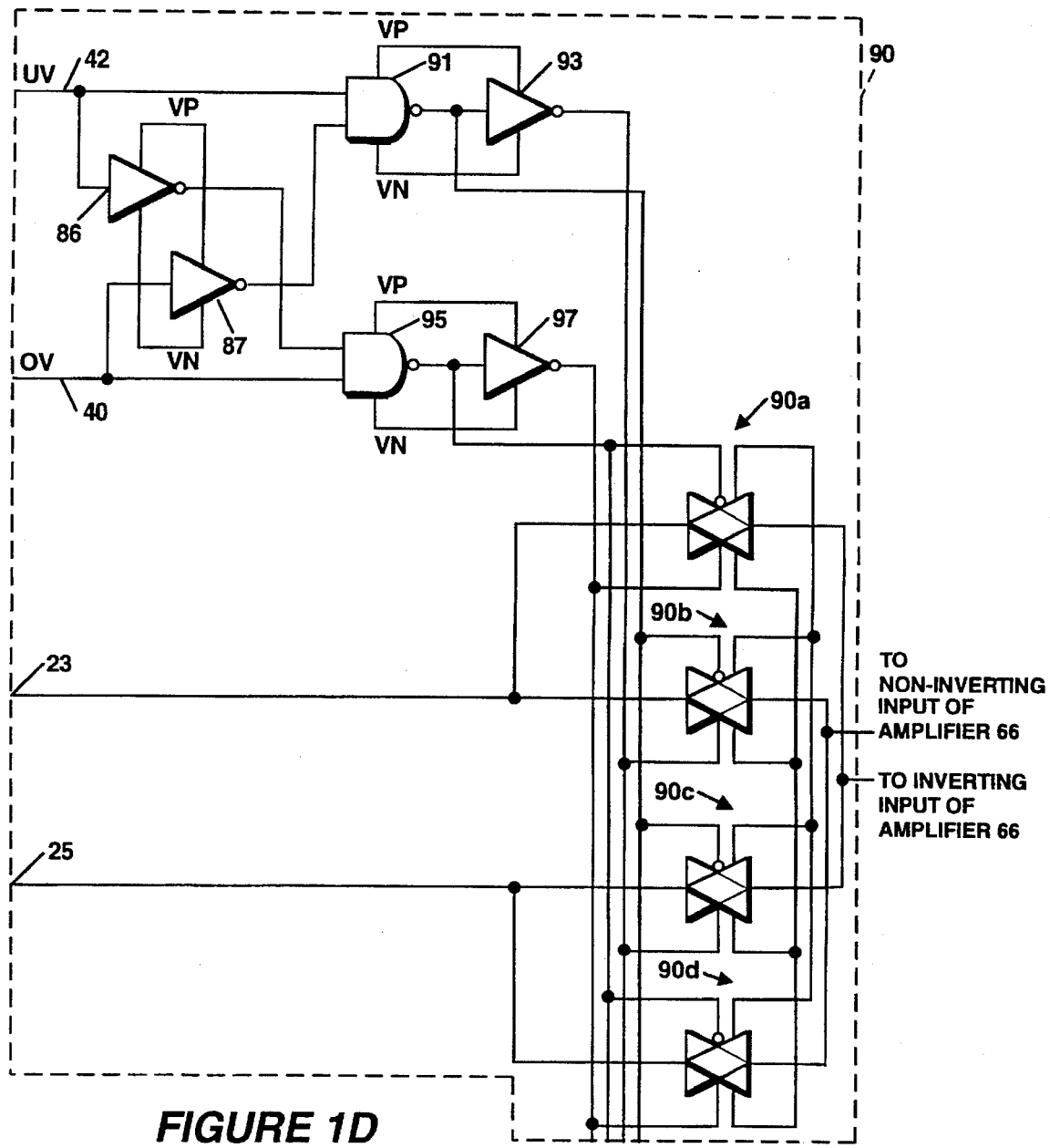
FIG. 1D is a schematic of the switch network of FIG. 1.

More particularly and referring also to FIG. 1D, the switch network 90 includes individual switches 90a–90d, connected as described above. In the illustrative embodiment, switches 90a–90d are implemented with two parallel connected FETs, one PMOS and one NMOS, as described below in conjunction with the illustrative switch of FIG. 4A. Suffice it here to say that each switch 90a–90d includes an NMOS FET having a drain terminal connected to a source terminal of a PMOS FET and a source terminal connected to a drain terminal of the PMOS FET. The gate terminal of the NMOS FET of each switch 90a–90d receives a control signal which is an inverted version of a control signal coupled to the gate terminal of the PMOS FET.

The switch network 90 includes a control portion responsive to the overvoltage signal 40 and the undervoltage signal 42, for generating the gate drive signals for the PMOS and NMOS FETs of each of the switches 90a–90d. A NAND gate 91 receives the undervoltage signal 42 at a first input and an inverted version of the overvoltage signal 40 (as inverted by an inverter 87) at a second input. The output of NAND gate 91 provides the gate drive signal for the PMOS FET of switch 90b and the PMOS FET of switch 90c and is inverted by an inverter 93, as shown. The output of inverter 93 provides the gate drive signal for the NMOS FET of switch 90b and the NMOS FET of switch 90c. A NAND gate 95 receives the overvoltage signal 40 at a first input and an inverted version of the undervoltage signal (as inverted by an inverter 86) at a second input. The output of NAND gate 95 provides the gate drive signal to the PMOS FET of switch 90a and to the PMOS FET of switch 90d and is inverted by an inverter 97. The output of inverter 97 provides the gate drive signal to the NMOS FET of switch 90a and the NMOS FET of switch 90d.

In operation, when an overvoltage condition occurs and as long as there does not exist an undervoltage condition, then switches 90a and 90d are closed and switches 90b and 90c are open. Similarly, when an undervoltage condition occurs and as long as there does not exist an overvoltage condition, then switches 90b and 90c are closed and switches 90a and 90d are open. Finally, when one of the cells 12a, 12b experiences an overvoltage condition and the other cell experiences an undervoltage condition, then all of the switches 90a–90d are open.

The output signal of the amplifier 66 is coupled to a first terminal 94a of a switch 94. A second terminal 94b of switch 94 is coupled to an output of a charge pump 98, to the gate terminal 50c of current carrying FET 50, and to a drain terminal 116a of an NMOS FET 116. A source terminal 116b of FET 116 is coupled to the chip substrate 52 and the gate terminal 116c receives an EN_SF signal 117 from the enable circuit 82, as shown.

Figure 2:
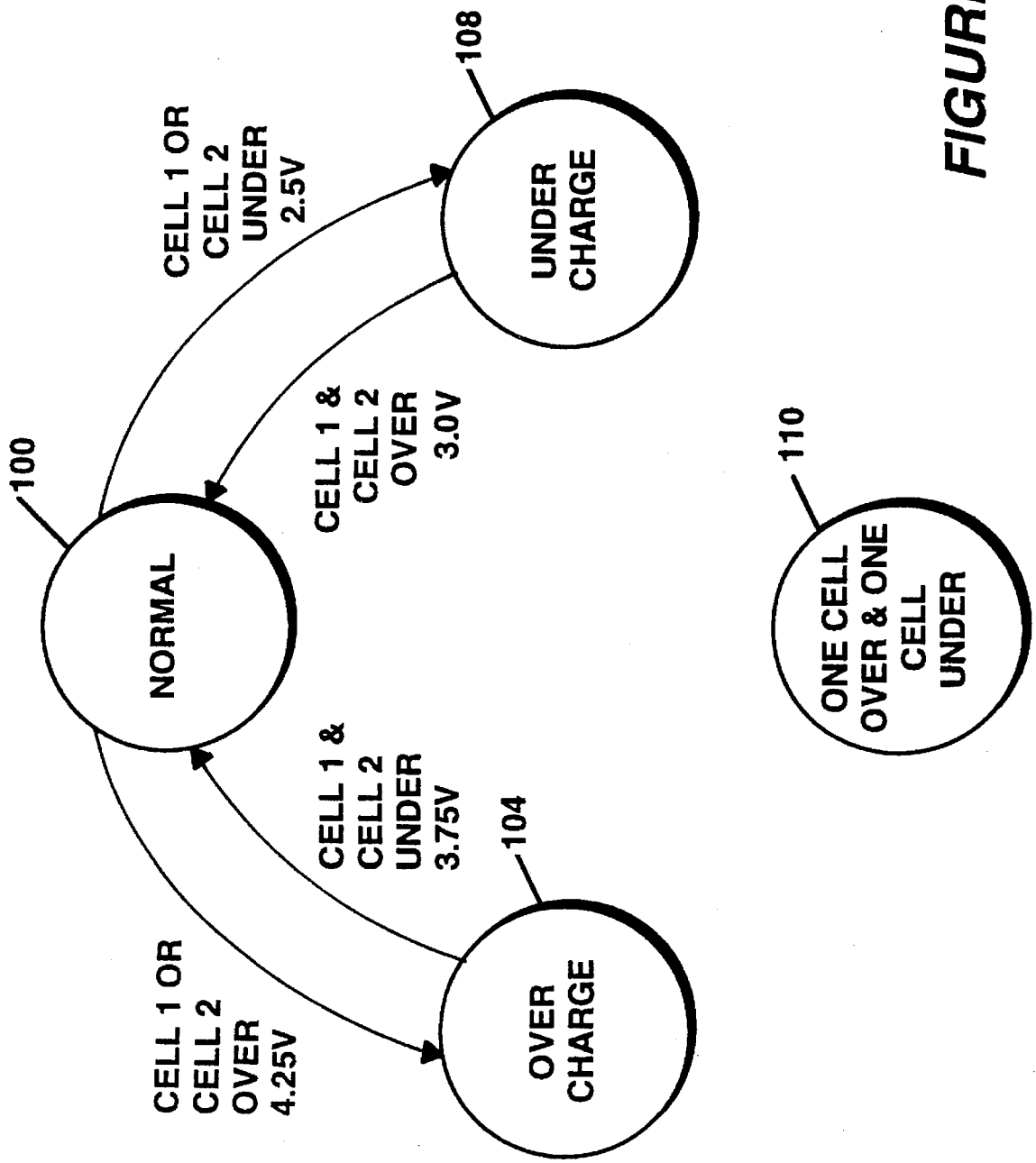
FIG. 2 is state diagram illustrating the operation of the battery protector of FIG. 1.

Referring also to FIGS. 1C and 2, the operation of the battery protector chip 10 will be described in conjunction with the four operational states of the battery protector 10 and the operation of the enable circuit 82. The enable circuit 82 generates the EN_SF signal 117, an EN_CP signal 85, and an EN_NF signal 115 in response to the overvoltage signal 40, the undervoltage signal 42, the CEBAR signal, the SCP signal and the SLPT signal. The EN_CP signal 85 enables and disables the charge pump 98. The EN_SF signal 117 controls the conduction of FET 116 and the EN_NF signal 115 controls the position of switch 94. It will be appreciated that the switch 94 need not be a discrete switch and may in fact, be implemented within the linear amplifier 66, such that the switch is responsive to the EN_NF signal 115 for isolating the amplifier 66 from the output of the charge pump 98.

The enable circuit 82 includes a NOR gate 106 which receives the overvoltage signal 40 at a first input and the undervoltage signal 42 at a second input. A NAND gate 109 also receives the overvoltage signal 40 at a first input and the undervoltage signal 42 at a second input. The output signal of NOR gate 106 is coupled to an input of a NAND gate 130 and to an input of a NOR gate 126, as shown. The output of NAND gate 130 is inverted by an inverter 138 to provide the EN_CP signal 85 and the output of NOR gate 126 provides the EN_NF signal 115. The SLPT, SCP and CEBAR signals are applied to respective input terminals of a NOR gate 107, the output of which is coupled to an input of a NAND gate 122. NAND gate 122 additionally receives the output of NAND gate 109 and provides the $EN_{13}$ SF signal 117 at an output thereof, as shown.

The normal state is entered when the overvoltage signal 40 and undervoltage signal 42 do not indicate an overvoltage or undervoltage condition, respectively. The absence of an overvoltage or undervoltage condition is based on different criteria depending on the prior state of operation of the battery protector 10, due to hysteresis built into the overvoltage and undervoltage states. Specifically, following power up of the battery protector 10, the absence of an overvoltage condition corresponds to the voltage across both of the cells 12a, 12b being less than or equal to a first threshold voltage, such as the illustrative 4.25 volts, and the absence of an undervoltage condition corresponds to the voltage across both of the cells 12a, 12b being greater than or equal to a second threshold voltage, such as the illustrative 2.5 volts. Thus, in these cases, the overvoltage threshold voltage is 4.25 volts and the undervoltage threshold voltage is 2.5 volts. Following operation in an overvoltage state 104, the absence of an overvoltage condition corresponds to the voltage across both of the cells 12a, 12b being less than or equal to a third predetermined threshold level (i.e., a hysteresis level which provides the overvoltage threshold voltage), such as 3.75 volts. Finally, following operation in an undervoltage state 108, the absence of an undervoltage condition corresponds to the voltage across both of the cells being equal to or exceeding a fourth predetermined threshold level (i.e., a hysteresis level which provides the undervoltage threshold level), such as 3.0 volts. In the normal state 100, current carrying FET 50 is closed (i.e., conducts), thereby permitting current flow into or out of the cells 12a, 12b.

More particularly, when neither an undervoltage condition nor an overvoltage condition exists (i.e., both the overvoltage signal 40 and the undervoltage signal 42 are at logic low levels), the output of NOR gate 106 is at a logic high level. As long as the chip 10 is not disabled, there does not exist a short circuit condition, low power operation has not been initiated and the chip temperature is acceptable, the output of NAND gate 130 will be low, causing the EN_CP signal 85 to be high, thereby enabling the charge pump 98. With the charge pump 98 enabled, the output of the charge pump causes the FET 50 to be turned on. Also, the output of NOR gate 126 (i.e., the EN_NF signal 115) will be low, which causes the switch 94 to open and decouple the output of the linear amplifier 66 from the gate terminal 50c of the FET 50. Additionally, the EN_SF signal 117 is low, which keeps the NMOS FET 116 off. With this arrangement, the gate terminal 50c of FET 50 is driven high by the output of the charge pump 98, in order to permit charge or load current to flow to or from the cells 12a, 12b, respectively.

If neither an undervoltage condition nor an overvoltage condition exists, but there exists either a short circuit condition, a chip disable condition, the chip 10 is in low power operation or the temperature of the chip is unacceptable, then the EN_CP signal 85 is low, which causes the charge pump 98 to be disabled. Also, the $EN_{13}$ NF signal 115 is low, causing the switch 94 to open and decouple the output of the linear amplifier 66 from the gate terminal 50c. Additionally, the EN_SF signal 117 is high which causes the FET 116 to be turned on, thereby turning off FET 50 by pulling the gate terminal 50c to ground.

In the event that the voltage across either of the cells 12a, 12b exceeds the first predetermined level, the overvoltage signal 40 transitions to a logic high state and the battery protector 10 enters the overcharge state 104 (alternatively referred to as an overvoltage state). The logic high overvoltage signal 40 causes the gate drive signal 96 to go low to turn off charge pump 98. Similarly, if the voltage across any of the cells 12a, 12b falls below the second predetermined level when the battery protector 10 is in the normal state of operation 100, then the battery protector 10 enters the undercharge state 108 (alteratively referred to as undervoltage or overdischarge state). In this state 108, the undervoltage signal 42 transitions to a logic high state, causing the charge pump 98 to be turned off.

More particularly, when either an undervoltage condition or an overvoltage condition occurs (i.e., when either the overvoltage signal 40 or the undervoltage signal 42 transitions to a logic high level), the output of NOR gate 106 is low. Under this condition, the EN_CP signal 85 is low (assuming that the chip 10 is not disabled, there does not exist a short circuit condition, the chip is not in low power operation and the chip temperature is acceptable). With this arrangement, the charge pump 98 is disabled. Since the EN_SF signal 117 is also low, FET 116 remains off. The EN_NF signal 115 is high, thereby coupling the output of linear amplifier 66 to the gate terminal 50c of FET 50 by closing switch 94. Thus, under this condition, the output of the linear amplifier 66 controls the conduction of the FET 50, as is further described below.

Once in the overcharge state 104, the FET 50 is permitted to be closed only if the cells 12a, 12b are attempting to discharge. Specifically, when the battery protector 10 is in the overcharge state 104, the switches 90a and 90d of the switch network 90 are closed in order to monitor the voltage across the current carrying FET 50. With switches 90a and 90d closed, the chip pin 23 is connected to the offset voltage 68 and the non-inverting input terminal of linear amplifier 66 is connected to the second terminal 50b of current carrying FET 50.

The linear amplifier 66 regulates the voltage across the FET 50 so as to maintain the offset voltage across the FET terminals 50a and 50b. That is, if a discharge current is trying to flow from the battery cells 12a, 12b, then the output voltage of amplifier 66 will increase to the point that the switch 50 is turned on, thereby permitting the cells 12a, 12b to be discharged in order to maintain the illustrative one-hundred millivolts of offset 68 thereacross. Thus, with this arrangement, the cells 12a, 12b are permitted to discharge, as is desirable to remove the overvoltage condition. On the other hand, if the charger 18 is attempting to supply current to the cells 12a, 12b while the battery protector 10 is in the overcharge state, then the output of linear amplifier 66 will decrease in order to maintain the one-hundred millivolts of offset 68 across FET 50. Specifically, the output of amplifier 66 will decrease so as to keep FET 50 off, thereby preventing charging current from flowing to the cells 12a, 12b during the overcharge state. Once the battery protector 10 is in the overcharge state 104, hysteresis built into the cell voltage detection and comparison circuit 30 ensures that the normal state 100 is not re-entered until the voltage across all of the cells 12a, 12b is less than the third predetermined voltage level, such as 3.75 V.

In the undervoltage state 108, FET 50 is permitted to be closed only if the charger 18 is attempting to charge the cells 12a, 12b. In this case, switches 90b and 90c of the switch network 90 are closed. Specifically, the non-inverting input terminal of amplifier 66 is coupled to chip pin 23 and the offset voltage 68 is coupled to switch terminal 50b. Thus, when the charger 18 is attempting to charge the cells 12a, 12b, the output of amplifier 66 increases in order to maintain the offset voltage 68 across the FET terminals 50a, 50b, thereby causing the FET 50 to conduct. Whereas, if the load 20 is attempting to discharge the cells 12a, 12b further, then the output of amplifier 66 decreases in order to maintain the offset voltage 68 across the FET 50, thereby causing the switch 50 to remain off. Hysteresis built into the cell voltage detection and comparison circuit 30 ensures that the normal state 100 is not re-entered from the undercharge state 108 until the voltage across all of the cells 12a, 12b is greater than a fourth predetermined voltage, such as 2.5 volts.

In the case where either an undervoltage condition or an overvoltage condition exists and there additionally exists either a short circuit condition, a chip disable condition, low power operation or the temperature of the battery protector chip 10 is unacceptable, the EN_CP signal 85 is low which disables the charge pump 98. The EN_NF signal 115 is also low which causes the output of amplifier 66 to be decoupled from the gate terminal 50c of FET 50 and the EN_SF signal 117 is high, thereby turning on FET 116 which serves to keep FET 50 off by pulling the gate terminal 50c to ground.

A fourth state of operation 110 occurs when one of the cells 12a, 12b experiences an overvoltage condition and the other cell experiences an undervoltage condition. In this case, the FET 116 conducts to prevent the current carrying FET 50 from conducting by pulling the gate terminal 50c to ground. That is, under these circumstances, and as long as there does not exist a short circuit condition, an unacceptable chip temperature, a chip disable condition or low power operation, the EN_CP signal 85 is low, thereby disabling the charge pump 98. The EN_NF signal 115 is low which causes the output of linear amplifier 66 to be decoupled from the gate terminal 50c of FET 50 and the EN_SF signal 117 is high, so as to turn FET 116 on. Thus, in operational state 110, the FET 50 is prevented from conducting.

In the case where there exists an undervoltage condition associated with one of the cells and an overvoltage condition associated with the other cell, and there additionally exists a short circuit condition, a chip disable condition, low power mode operation or the temperature of the battery protector chip 10 is unacceptable, the output signals EN_CP, EN_NF and EN_SF remain in the same states (i.e., the EN_CP signal is low, the EN_NF signal is low and the EN_SF signal is high), in order to keep FET 116 on and FET 50 off.

Also provided on the battery protector chip 10 is an optional "kill" feature which includes a "kill" pin 28 adapted for connection to an external fuse (not shown) in order to permanently disable the battery pack (i.e., including the protector chip 10 and cells 12a, 12b and having terminals at chip pins 21 and 25) upon the occurrence of an overvoltage condition. More particularly, a latch 92 has a set input connected to the overvoltage signal 40 and a reset input connected to the CEBAR signal. The occurrence of an overvoltage condition causes the latch 92 to be set which, in turn, causes the external fuse to be blown. The latch 92 is reset by the CEBAR signal, as may be desirable for testing purposes.

The reference and thermal shutdown circuit 34 generates a plurality of reference voltages 125, such as the illustrative four predetermined threshold voltages, for use by the cell voltage detection and comparison circuit 30. The reference voltage generator portion of circuit 34 may be of any conventional form, such as Zener diodes for generating precision reference voltages 125 or a regulator. In addition to providing reference voltages 125, circuit 34 additionally provides the thermal shutdown (TS) signal which is indicative of whether or not the temperature of the chip 10 is within an acceptable range.

Reference voltages are also provided by circuit 34 to an inverting input terminal of a short circuit comparator 118 and to a non-inverting input terminal of a reset comparator 114. The non-inverting input terminal of the short circuit comparator 118 is coupled to switch terminal 50a and the inverting input terminal of the reset comparator 114 is coupled to switch terminal 50b, as shown.

With this arrangement, in the event of a short circuit across the battery pack (i.e., between pins 21 and 25), the voltage at switch terminal 50a goes above the reference voltage at the inverting input terminal of comparator 118, causing the output of the comparator to go high, to set a short circuit latch 112. The output of comparator 118 is additionally coupled to a CDLY pin 24 of the chip 10 which is adapted for having a capacitor (not shown) coupled thereto. Such a capacitor serves to delay the setting of the short circuit latch 112, such as may be desirable in certain applications. Once the short circuit condition is removed, the output of the reset comparator 114 transitions to a logic high level, causing the short circuit latch 112 to be reset.

The output of the short circuit latch 112 provides the SCP signal and is coupled to the reset comparator 114 in order to enable the reset comparator 114 when the latch 112 is set. In this way, power consumption is conserved since the reset comparator 114 is only enabled when needed (i.e., when the short circuit latch 112 is set). The output of latch 112 is additionally coupled to the enable circuit 82.

Figure 3:
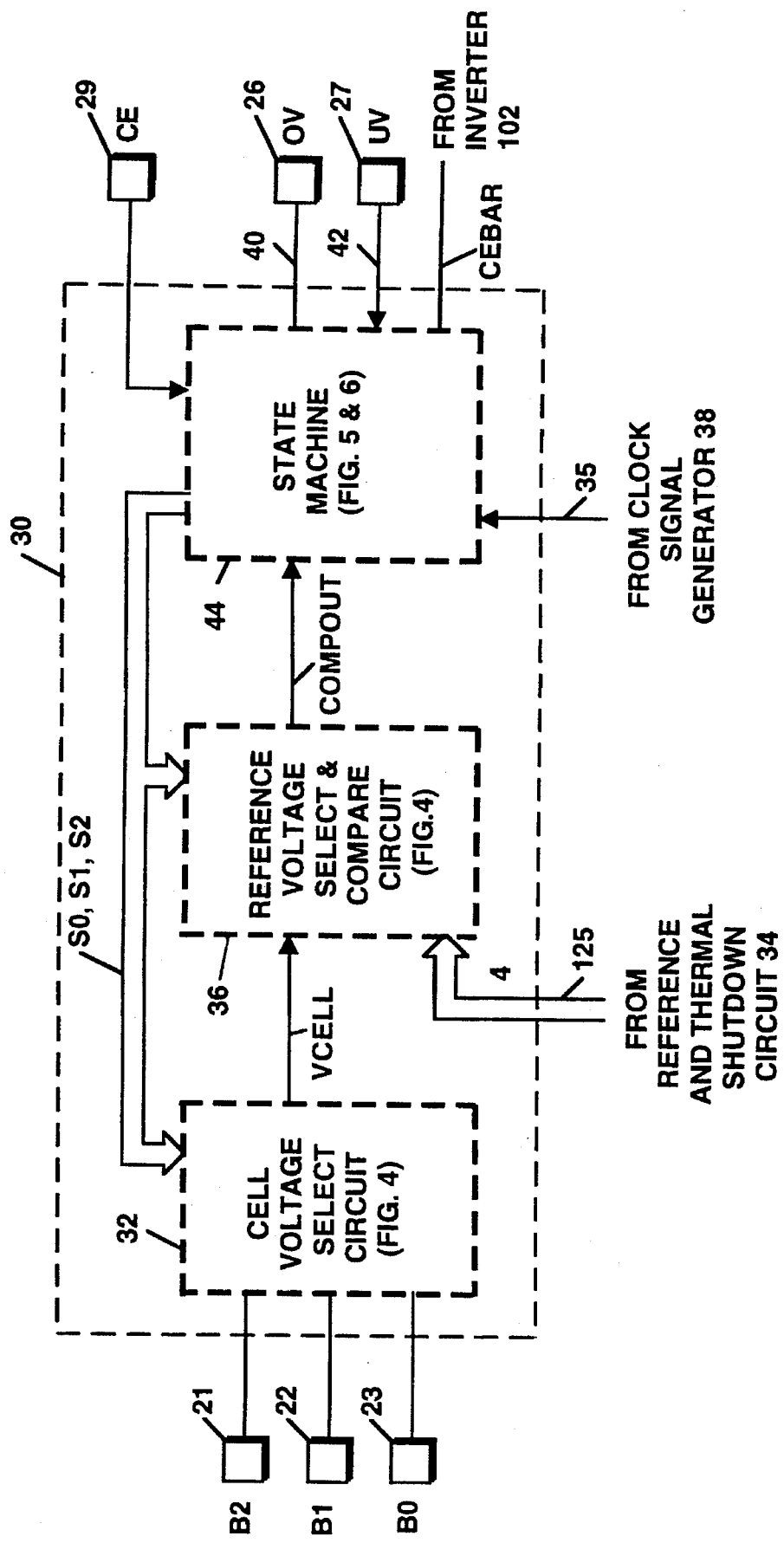
FIG. 3 is a block diagram of an illustrative embodiment of the cell voltage detection and comparison circuit of FIG. 1.
Figure 4A:
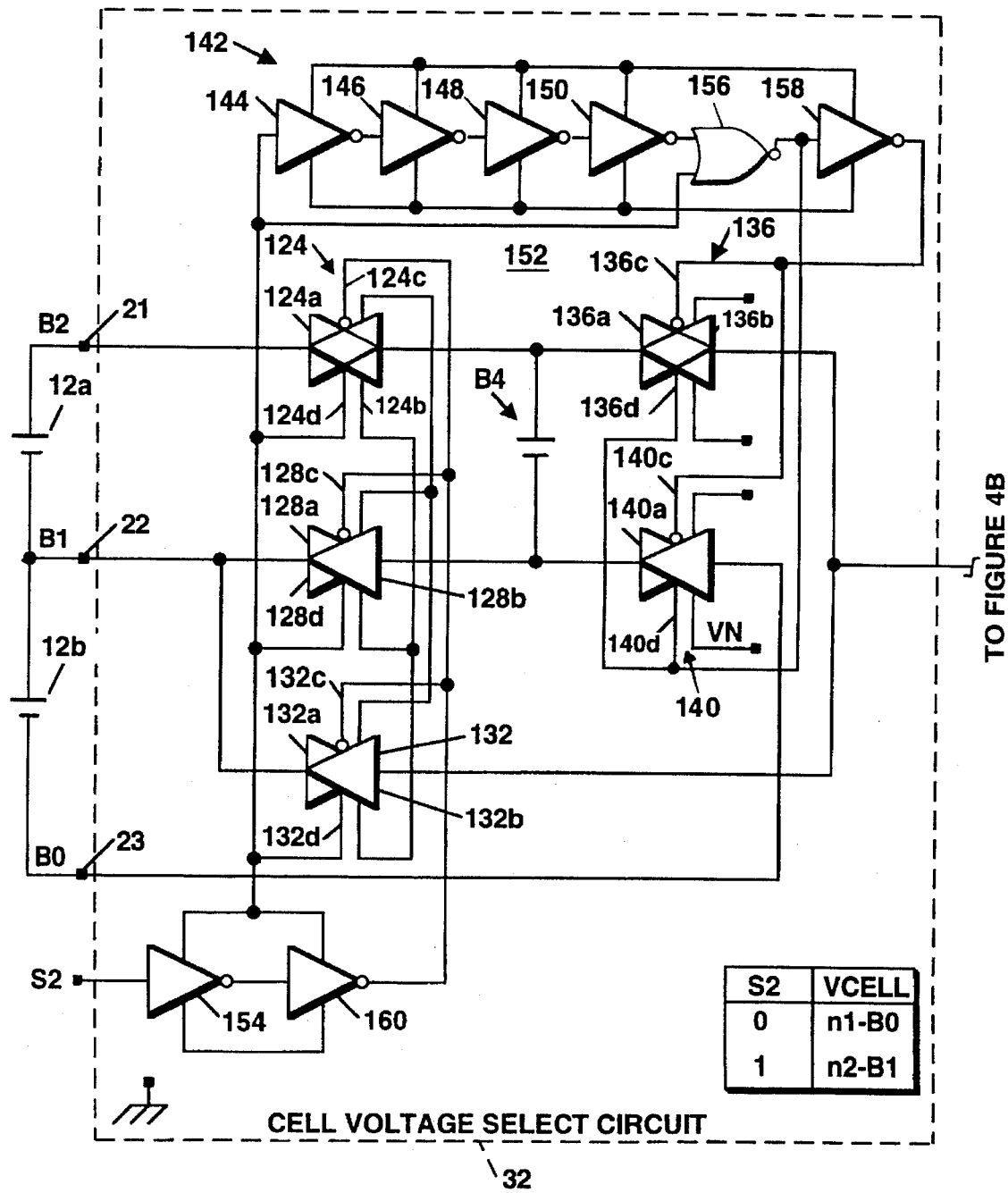
FIG. 4A is a schematic of the cell voltage select circuit.
Figure 4B:
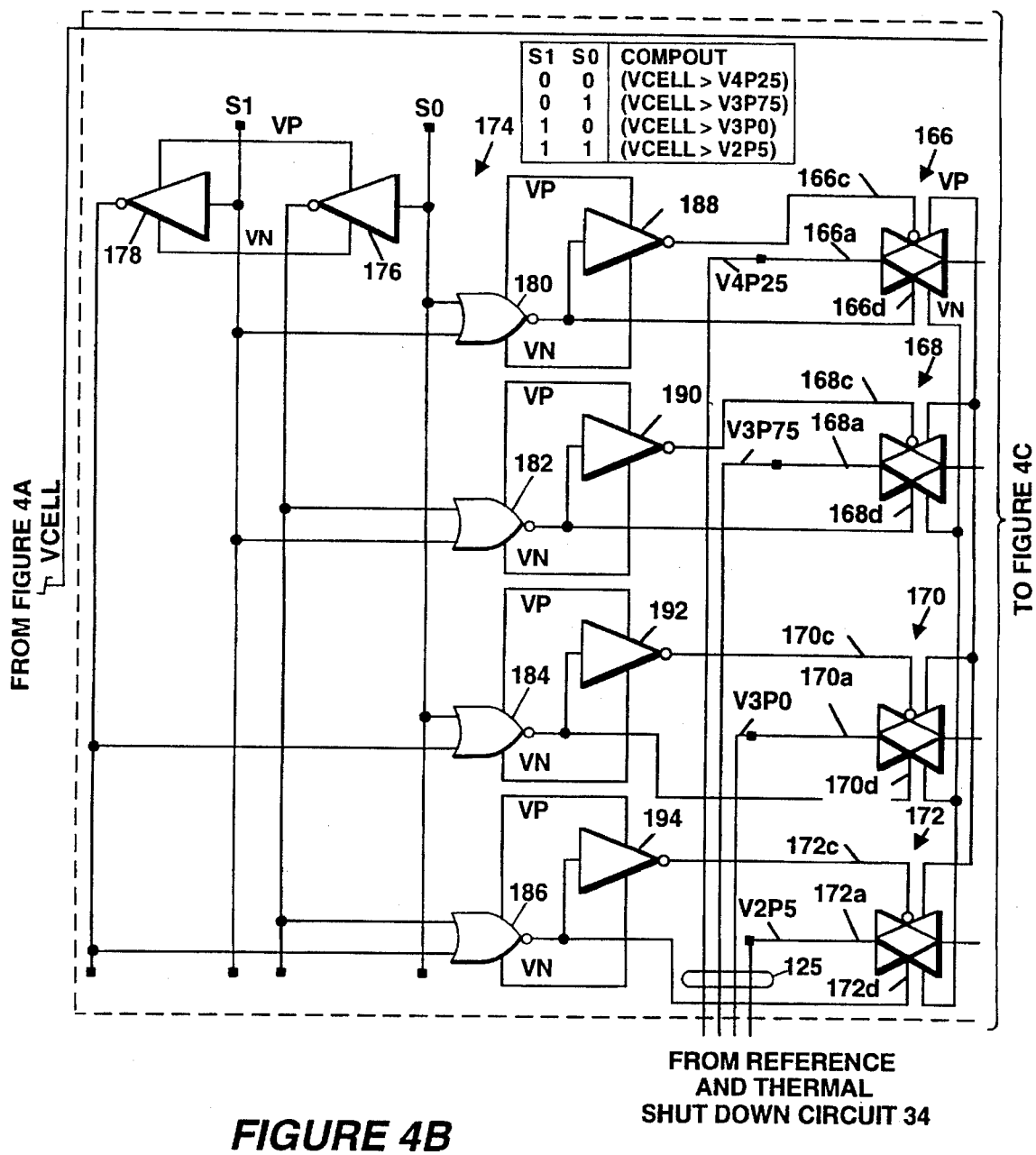
FIG. 4B is a schematic of part of the reference voltage select and compare circuit.

Referring also to FIG. 3, a block diagram of one embodiment of the cell voltage detection and comparison circuit 30 of FIG. 1 is shown to include a cell voltage select circuit 32, a reference voltage select and compare circuit 36 and a state machine 44. The cell voltage select circuit 32 is coupled to pins 21, 22 and 23 of the chip 10 for further coupling to the terminals of battery cells 12a, 12b, as shown in FIG. 1. The circuit 32 functions in the manner of a multiplexer, to select the voltage across one of the cells 12a, 12b for comparison to a reference voltage and will be described further in conjunction with FIGS. 4A–4D.

The output signal of the cell voltage select circuit 32 is a VCELL signal which is indicative of the voltage across the cell 12a, 12b presently selected by the circuit 32. The reference voltage select and compare circuit 36 is responsive to the VCELL signal and to the plurality of reference voltages 125 provided by the reference circuit 34 (FIG. 1)

for selecting one of the reference voltages for comparison to the VCELL signal and for comparing the selected reference voltage to the VCELL signal, as will also be described further in conjunction with FIGS. 4A–4D. The output signal of the reference voltage select and compare circuit 36 is a COMPOUT signal which is provided to the state machine 44.

The state machine 44 is responsive to the COMPOUT signal, the clock signal 35 from the clock signal generator 38 (FIG. 1), the CE signal and the CEBAR signal, for generating the overvoltage signal 40 and the undervoltage signal 42, as will be described in conjunction with FIGS. 5 and 6. The state machine 44 also provides control signals S0, S1, and S2 to the cell voltage select circuit 32 and to the reference voltage select and compare circuit 36, as will be described.

Referring also to FIGS. 4A–4D, a schematic of the cell voltage select circuit 32 and the reference voltage select and compare circuit 36 is shown with the positive and negative supply voltage signal lines labelled VP and VN, respectively. Circuit 32 includes a network of switches 152, including individual switches 124, 128, 132, 136 and 140, which are controlled by control signal S2. As will become apparent by reference to FIG. 5 below, control signals S0, S1 and S2 are provided by a counter associated with the state machine 44, with S2 being the most significant bit and S0 being the least significant bit.

Each of the switches of network 152 is comprised of an NMOS FET coupled in parallel with a PMOS FET, as shown in FIG. 4D for illustrative switch 124. More particularly, the drain terminal of the NMOS FET 62 is connected to the source terminal of the respective PMOS FET 61 and to a terminal 124a of the switch 124. The source terminal of the NMOS FET 62 is connected to the drain terminal of the PMOS FET 61 and to a terminal 124b of the switch 124. The gate terminal of the PMOS FET 61 is connected to a terminal 124c of the respective switch 124 and the gate terminal of the NMOS FET 62 is connected to a terminal 124d of the respective switch 124. Reference hereinafter to a closed switch corresponds to the switch terminals 124a and 124b being connected and reference to an open switch corresponds to such switch terminals being disconnected.

The first terminal 124a of switch 124 is connected to pin 21 and the second terminal 124b is connected to a first terminal of a capacitor 134 and to a first terminal 136a of a switch 136. A second terminal 136b of switch 136 provides the VCELL signal, as shown. Switch 128 has a first terminal 128a connected to pin 22 and a second terminal 128b connected to a second terminal of capacitor 134 and further to a first terminal 140a of switch 140. Switch 140 has a second terminal 140b connected to pin 23. Switch 132 has a first terminal 132a connected to pin 22 and a second terminal 132b connected to the second terminal 136b of switch 136, as shown.

The NMOS FETs of switches 124, 128 and 132 are controlled by an inverted version of signal S2 provided at the output of an inverter 154 and applied to switch terminals 124d, 128d, and 132d, respectively. The PMOS FETs of switches 124, 128 and 132 are controlled by a further inverted version of the signal S2 provided at the output of an inverter 160 and applied to switch terminals 124c, 128c and 132c, respectively.

The inverted version of signal S2 is also coupled to a delay circuit 142 which includes a plurality of inverters 144, 146, 148, 150 and 158 and a NOR gate 156 arranged to provide a delay. Specifically, the circuit 142 provides a delay with respect to the negative going edge of the inverted S2 signal, since the output of NOR gate 156 does not transition to a logic high level until a logic low at the input of inverter 144 propagates through inverters 144, 146, 148 and 150. The NMOS FETs of switches 136 and 140 are controlled by the delayed output of NOR gate 156 applied to switch terminals 136d and 140d and the PMOS FETs of switches 136 and 140 are controlled by an inverted version of the delayed signal provided at the output of inverter 158 and coupled to terminals 136c and 140c.

Switch network 152 operates in the manner of a multiplexer to couple the voltage across a selected one of the cells 12a, 12b to the VCELL signal line for further coupling to a comparator 162. In the illustrative embodiment, control signal S2 is high for a duration of four clock cycles and is subsequently low for the following four successive clock cycles. With this arrangement, the voltage across one of the cells 12a, 12b is processed by comparator 162 for four clock cycles followed by the voltage across the other, previously non-selected cell being processed by comparator 162 for four clock cycles.

Consider first the case where the S2 signal is in a logic low state, corresponding to input switches 124, 128 and 132 being closed. In this condition, switches 136 and 140 are open and capacitor 134 is charged to a voltage corresponding to the voltage across cell 12a, while the voltage across cell 12b is coupled to the VCELL signal line through closed switch 132.

When the control signal S2 is at a logic high level, switches 124, 128 and 132 are opened and, after the delay associated with delay circuit 142 lapses, switches 136 and 148 are closed. In this case, the voltage to which capacitor 134 has been charged (i.e. the voltage across cell 12a) is coupled to the VCELL signal line and the voltage across cell 12b is disconnected from the VCELL signal line.

The comparator 162 of the reference voltage select and compare circuit 36 receives the VCELL signal at a non-inverting input terminal 162a and a reference voltage at an inverting input terminal 162b. Thus, when the signal S2 is low, the voltage across cell 12b is compared by comparator 162 to a reference voltage coupled to the inverting input terminal 162b of comparator 162; whereas, when the signal S2 is at a logic high level, the voltage across cell 12a is compared to the reference voltage by comparator 162.

The circuit 36 is responsive to the reference voltages 125 provided by circuit 34 (FIG. 1). In the illustrative embodiment, the reference circuit 34 generates a first predetermined threshold, or reference voltage having the first predetermined level of 4.25 volts (i.e., the V4P25 signal), a second reference voltage having the second predetermined level of 2.5 volts (i.e., the V2P5 signal), a third reference voltage having the third predetermined level of 3.75 volts (i.e., the V3P75 signal), and a fourth reference voltage having the fourth predetermined level of 3.0 volts (i.e., the V3P0 signal).

Circuit 36 includes circuitry for coupling a selected one of these reference voltages 125 to the comparator 162. A plurality of switches 166, 168, 170, and 172 are provided, each being of the type including a PMOS FET and an NMOS FET, as described above in conjunction with exemplary switch 124 in FIG. 4D. More particularly, each switch 166–172 includes a first terminal 166a–172a receiving a respective one of the reference voltages 125 and a second terminal 166b–172b coupled to the inverting input terminal 162b of comparator 162. Each of the switches 166–172 further includes a third terminal 166c–172c which is coupled internally to the gate terminal respective of the PMOS FET and a fourth terminal 166d–172d which is coupled internally to the gate terminal of the respective NMOS FET.

A control circuit 174 generates gate drive signals for the PMOS and NMOS FETs of each of the switches 166–172 in response to control signals S0 and S1 provided by the state machine 44. The control circuit 174 includes an inverter 176 which inverts the control signal S0 and an inverter 178 which inverts the control signal S1, as shown. Control signal S0 is coupled to an input of NOR gates 180 and 184 and control signal S1 is coupled to an input of NOR gates 180 and 182. The inverted version of control signal S0 is coupled to an input of NOR gate 182 and an input of NOR gate 186 and the inverted version of control signal S1 is coupled to an input of NOR gate 184 and to an input of NOR gate 186, as shown. The output signals of NOR gates 180, 182, 184 and 186 control the gate terminal of the NMOS FET within a respective one of switches 166, 168, 170 and 172. Inverters 188, 190, 192 and 194 invert the output signal of respective NOR gates 180, 182, 184 and 188 to provide gate drive signals for the PMOS FETs within switches 166, 168, 170 and 172, respectively.

In operation, control circuit 174 operates in the manner of a two-to-four decoder. When control signals S0 and S1 are both at a logic low level, switch 166 is closed and remaining switches 168, 170 and 172 are open, thereby coupling the 4.25 V reference voltage to comparator 162. When control signal S0 is high and control signal S1 is low, switch 168 is closed and the remaining switches 166, 170 and 172 are open, thereby coupling the 3.75 V reference voltage to the comparator 162. When control signal S0 is low and control signal S1 is high, switch 170 is closed and switches 166, 168 and 172 are open so as to select the 3.0 V reference voltage for coupling to comparator 162. Finally, when control signal S0 and control signal S1 are both in a logic high state, switch 172 is closed and switches 166, 168 and 170 are open, so as to couple the 2.5 V reference voltage to the comparator 162.

Since control signals S0 and S1 are the least significant bit and the next least significant bit of a three bit counter, each of the four above described switch conditions occurs during a single clock cycle and repeats every fourth clock cycle. Thus, during a first clock cycle, comparator 162 compares the voltage across cell 12b to the 4.25 V reference, during a second clock cycle, the voltage across cell 12b is compared to the 3.75 V reference, during a third clock cycle, the voltage across cell 12b is compared to the 3.0 V reference and during a fourth clock cycle, the voltage across cell 12b is compared to the 2.5 V reference. During a fifth clock cycle, the voltage across cell 12a is compared to the 4.25 V reference, during a sixth clock cycle, the voltage across cell 12a is compared to the 3.75 V reference, during a seventh clock cycle, the voltage across cell 12a is compared to the 3.0 V reference and during an eighth clock cycle, the voltage across cell 12a is compared to the 2.5 V reference.

Figure 5A:
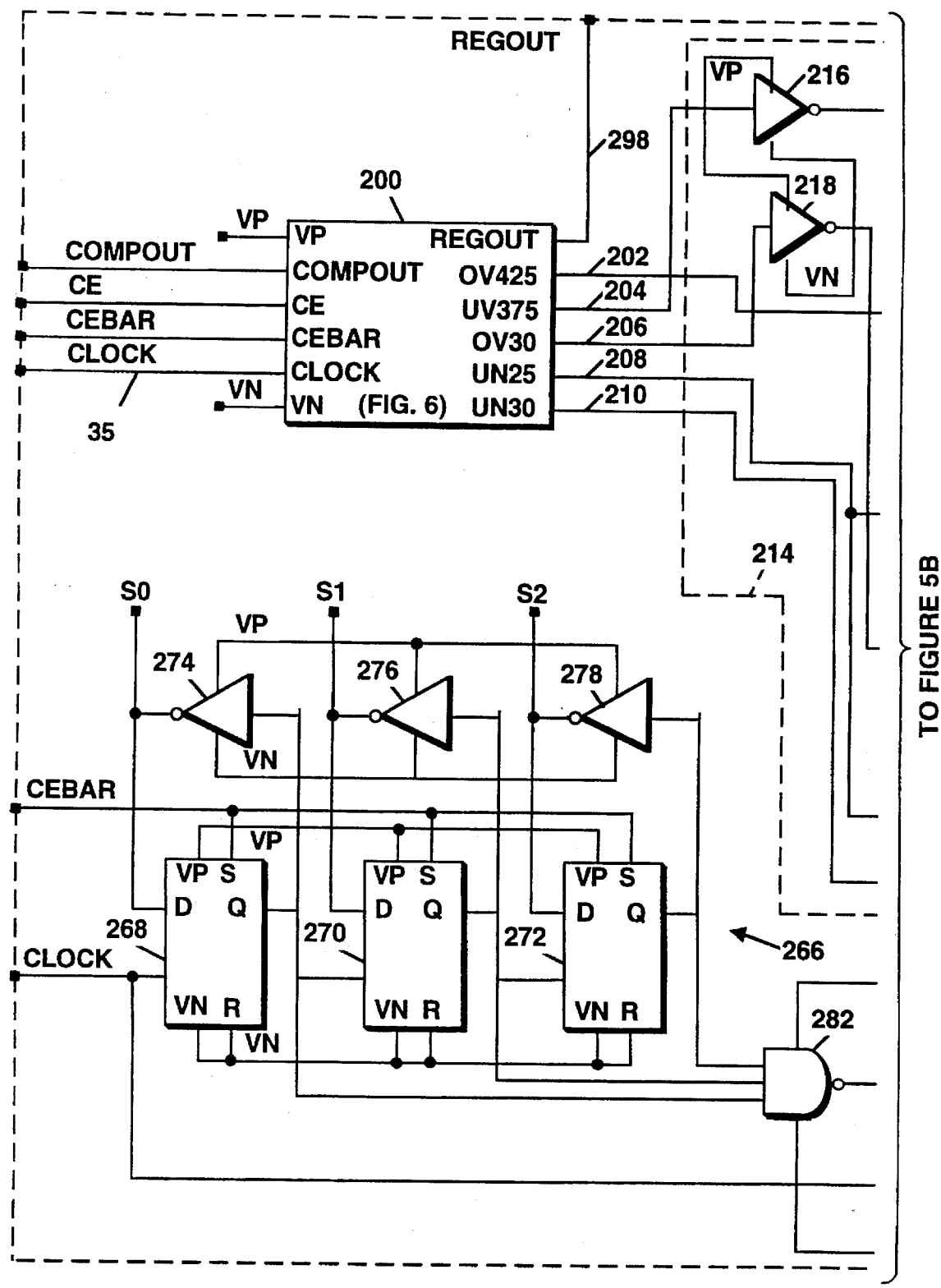
FIG. 5A is a schematic of the state machine of FIG. 3.
Figure 5B:
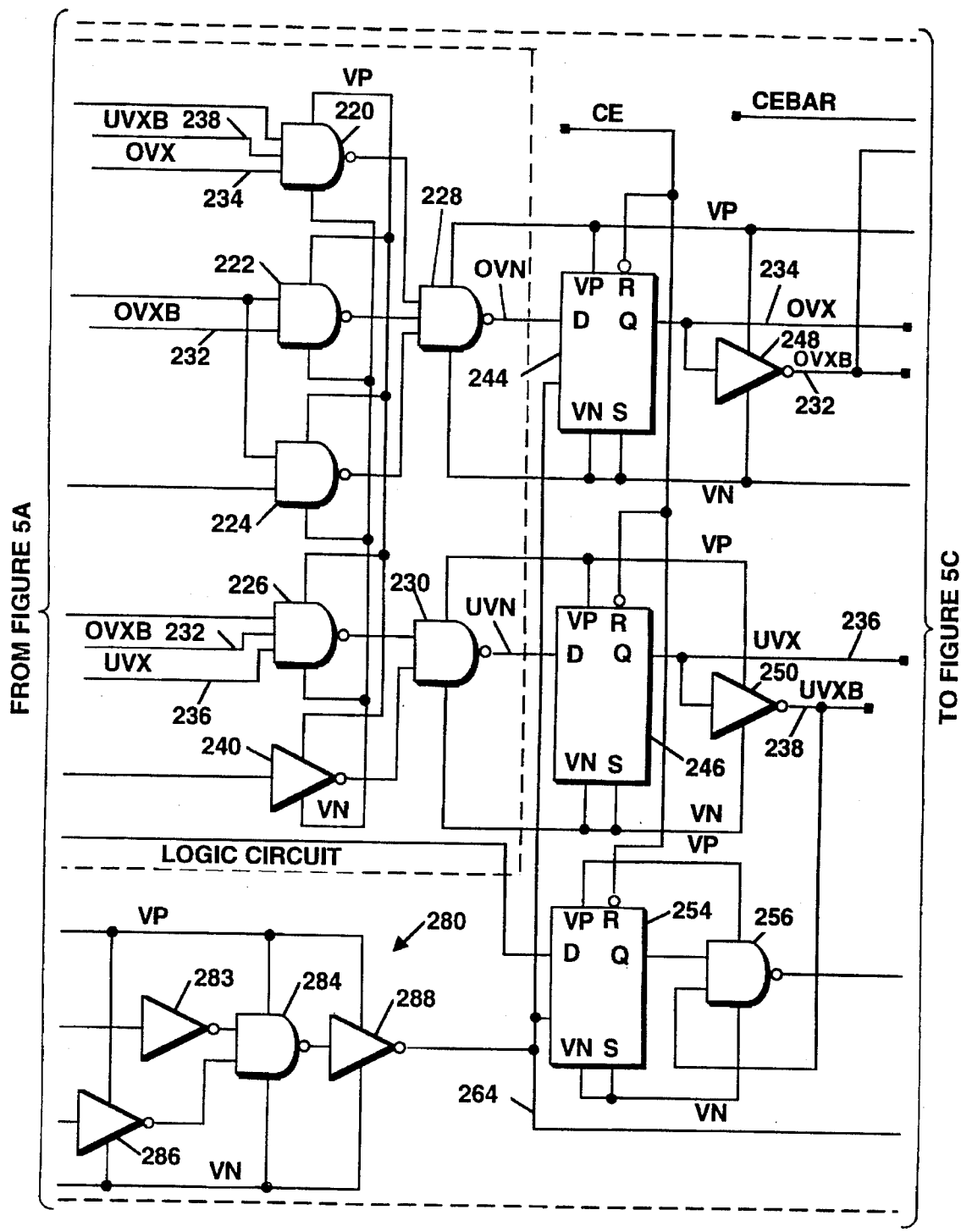
FIG. 5B is a schematic of another part of the state machine of FIG. 3.
Figure 5C:
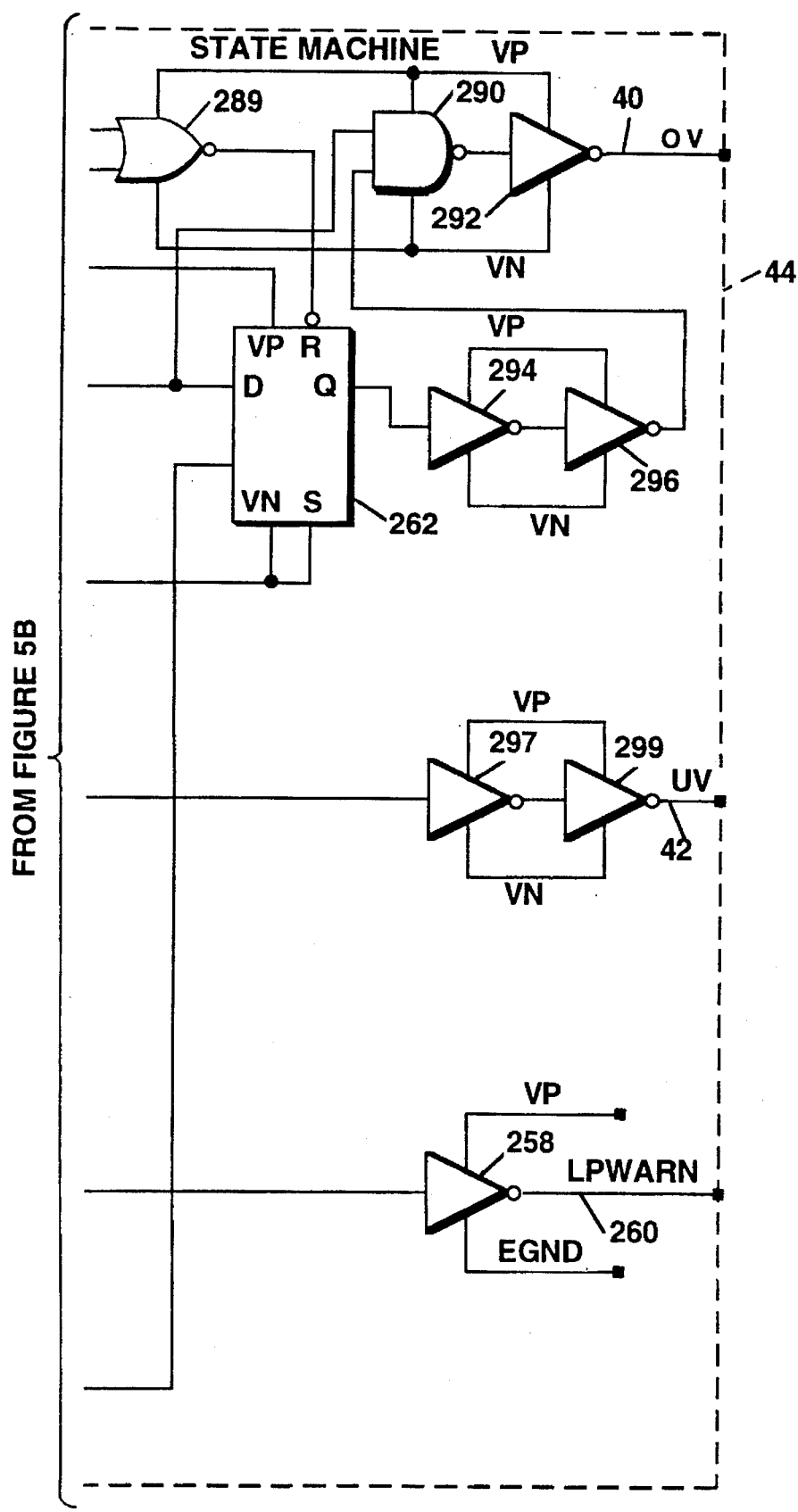
FIG. 5C is a schematic of the remaining part of the state machine of FIG. 3.

Referring also to FIGS. 5A–5C, the COMPOUT output signal of comparator 162 is shown to be coupled to the state machine 44 (FIG. 3). More particularly, the COMPOUT signal is coupled to a shift register 200 which is shown and described further below in conjunction with FIG. 6. Shift register 200 also receives the CEBAR signal from the output of the inverter 102 of FIG. 1, and clock signal 35 from the clock signal generator 38 (FIG. 1). The shift register 200 generates a OV425 signal on line 202, the logic state of which indicates whether the voltage across either cell 12a or 12b is greater than 4.25 volts. The shift register 200 also generates a UN375 signal on line 204 indicative of whether the voltage across both of the cells 12a and 12b is less than 3.75 volts. Similarly, the shift register 200 generates an OV30 signal on line 206 indicative of whether the voltage across both cells 12a and 12b is greater than 3.0 volts and finally, the shift register 200 generates a UN25 signal on line 208, indicative of whether or not the voltage across either cell 12a or 12b is less than 2.5 volts. These shift register output signals 202–208 are provided to a logic circuit 214 which determines the state of the state machine 44, as will be described below. The shift register 200 additionally generates a UN30 signal on line 210 which indicates whether the voltage across the selected cell is less than 3.0 V and which is used in conjunction with a low power warning feature, described below. A REGOUT signal 298 provides access to the output signal of shift register 200 for testing purposes.

Logic circuit 214 includes a pair of inverters 216, 218 for inverting the UN375 signal 204 and the OV30 signal 206, respectively, as shown. Also provided are six NAND gates 220, 222, 224, 226, 228 and 230. NAND gate 220 has three input terminals, a first receiving the inverted UN375 signal, a second receiving a UVXB signal 238, and a third receiving an OVX signal 234. NAND gate 226 likewise has three inputs, a first receiving the inverted OV30 signal, and second and third inputs receiving an OVXB signal 232 and a UVX signal 236, respectively. NAND gates 222 and 224 each have two inputs. A first input of NAND gate 222 receives the OV425 signal 202 and a second input receives the OVXB signal 232. NAND gate 224 receives the OV425 signal 202 and the UN25 signal 208, as shown. An inverter 240 inverts the UN25 signal 208.

NAND gates 220, 222, 224 and 226, as well as inverter 240, provide inputs to NAND gates 228 and 230. More particularly, NAND gate 228 has three inputs, a first coupled to the output of NAND gate 220, a second coupled to the output of NAND gate 222 and a third coupled to the output of NAND gate 224. NAND gate 230 has two inputs, a first coupled to the output of NAND gate 226 and a second coupled to the output of inverter 240. The output signal of NAND gate 228 (i.e., the OVN signal) is coupled to the input of a flip-flop 244 and the output signal of NAND gate 230 (i.e., a UVN signal) is coupled to the input of a flip-flop 246. The output of flip-flop 244 provides the OVX signal 234 and the output of the flip-flop 246 provides the UVX signal 236. Inverters 248 and 250 invert the OVX and UVX signals 234, 236 to provide the OVXB signal 232 and the UVXB signal 238, respectively, as shown. Inverters 297 and 299 invert the UVX signal 236 to provide the undervoltage signal 42.

The OVX signal 234 is coupled to the input of a flip-flop 262, the output of which is inverted by inverters 294 and 296, as shown. A NAND gate 290 receives the OVX signal 234 and the output of inverter 296 and provides an output signal to an inverter 292 which generates the overvoltage signal 40. The OVXB signal 232 is coupled to an input of a NOR gate 289 which additionally receives the CEBAR signal. NOR gate 289 provides an active low reset signal to the flip-flop 262. With the use of the additional flip-flop 262, conditions causing the overvoltage signal to be at a logic high level must occur at two successive state transitions before the overvoltage signal 40 transitions to a logic high level. In this way, the likelihood of a false indication of an overvoltage condition is reduced.

The CE signal is coupled to each of the flip-flops 244, 246 and 254 for the purpose of resetting such flip-flops. Use of the CE signal in this manner insures that the state machine 44 is in a known state upon power up of the battery protector 10. Each of the flip-flops 244, 246, 254, and 262 is clocked by a signal 264 provided by a logic circuit 280 coupled to the output of a counter circuit 266. Counter circuit 266 includes flip-flops 268, 270 and 272 and inverters 274, 276 and 278. Control signals S0, S1 and S2 are generated by the counter circuit 266, at the output of inverters 274, 276 and 278, respectively, which are arranged to invert the output of flip-flops 268, 270 and 272, respectively. With this arrangement, the control signals S0, S1 and S2 provide a binary count from 000 to 111, with S2 being the most significant bit and S0 being the least significant bit.

Logic circuit 280 is provided in order to clock the state machine 44 at the proper time relative to the contents of the shift register 200. More particularly, the logic circuit 280 includes a NAND gate 282 receiving the output signal of each of the counter flip-flops 268–272, as shown. The output of NAND gate 282 is inverted by an inverter 283 and the output of inverter 283 is coupled to a second NAND gate 284 which also receives an inverted version of the clock signal 35 generated by an inverter 286. The output signal of NAND gate 284 is inverted by an inverter 288 to provide the clocking signal 264 to state machine flip-flops 244, 246, 254 and 262, as shown.

Flip-flop 254 is provided to implement the low power warning feature and receives the UN30 signal 210 at the input thereof. The output of flip-flop 254 is coupled to a NAND gate 256, the output of which is inverted by an inverter 258, to provide the LPWARN signal 260. In operation, the LPWARN signal 260 is in a logic high state when the voltage across any of the cells 12a, 12b is below the 3.0 V threshold level. This low power warning feature is disabled, however, once the voltage across either of the cells 12a, 12b falls below 2.5 volts. More particularly, when the voltage across either of the cells falls below 2.5 volts, the UVXB signal 238 goes low, thereby causing the output of NAND gate 256 to transition to a logic high level and thus, the LPWARN signal 260 to transition to a logic low level.

The state machine 44 implements the operational states shown in the state diagram of FIG. 2 and described above. To this end, the boolean expression for the UVN signal is given by the following equation:

$$OVN = OV \cdot \overline{UV} \cdot \overline{UN38} + \overline{OV} \cdot OV43 + OV43 \cdot UN25 \quad (1)$$

and the boolean expression for the UVN signal is given by the following equation:

$$UVN = \overline{OV} \cdot UV \cdot \overline{OV30} + UN25 \quad (2)$$

Figure 6:
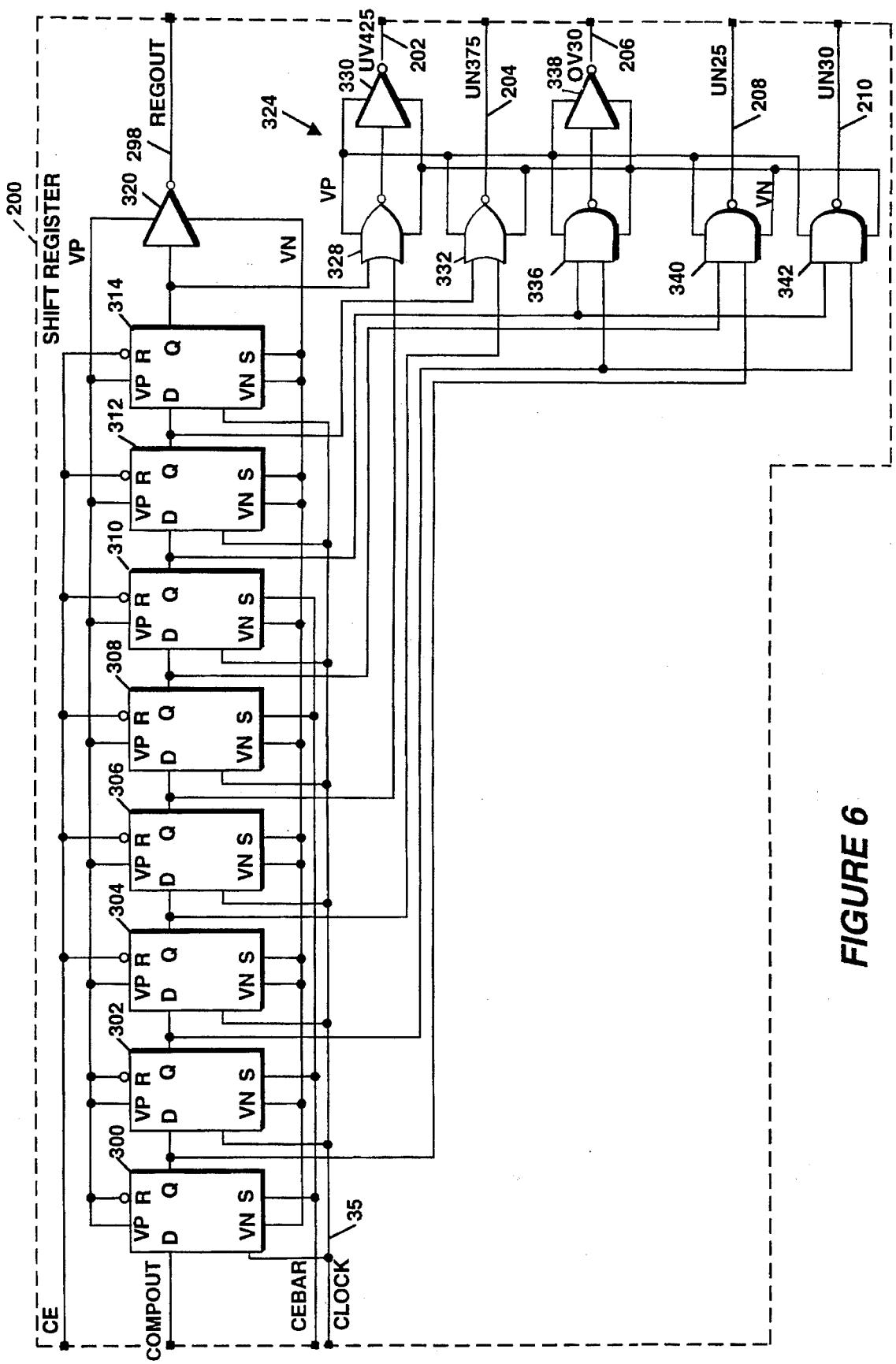
FIG. 6 is a schematic of the shift register of the state machine of FIGS. 5A–5C.

Referring also to FIG. 6, a schematic of the shift register 200 of the state machine 44, is shown. The shift register 200 includes a plurality of flip-flops 300, 302, 304, 306, 308, 310, 312 and 314. Flip-flops 300–314 are series-connected, with the output of one coupled to the input of the successive flip-flop except that the first flip-flop 300 receives the COMPOUT signal at an input, as shown. Shift register flip-flops 304, 306, 312 and 314 are reset by the CE signal, thereby insuring that upon power up, the output signals of the shift register 200 are in a known state. The CEBAR signal sets flip-flops 300, 302, 308 and 310. The clock signal 35 is coupled to the clock input of flip-flops 300–314, as shown. An inverter 320 inverts the output of the last flip-flop 314 to provide the REGOUT signal 298.

The output of each flip-flop 300–314 is coupled to a logic circuit 324 which provides the OV425 signal 202, the UN375 signal 204, the OV30 signal 206, the UN25 signal 208 and the UN30 signal 210. More particularly, logic circuit 324 includes a NOR gate 328 which receives the output signals from flip-flops 306 and 314 and provides an output signal which is inverted by an inverter 330 to provide the OV425 signal 202. The OV425 signal 202 is at a logic high level if the voltage across either of the cells 12a or 12b is greater than 4.25 volts. A second NOR gate 332 receives the output signals from flip-flops 304 and 312 and provides the UN375 signal 204 in a logic high state when the voltage across both cells 12a and 12b is less than 3.75 volts.

A NAND gate 336 has inputs coupled to the output of flip-flops registers 302 and 310, as shown. The output of NAND gate 336 is coupled to an inverter 338 which generates the OV30 signal 206. The OV30 signal 206 is high when the voltage across both cells 12a and 12b is greater than 3.0 volts. A NAND gate 340 receives the output signal from flip-flops 300 and 308 and generates the UN25 signal 208 at its output. The UN25 signal 208 is at a logic high level if the voltage across either cell 12a or 12b is less than 2.5 volts. Finally, a NAND gate 342 has a pair of input terminals coupled to the output of flip-flops 302 and 310, as shown. The output signal of NAND gate 342 is the UN30 signal 210 which is at a high level if the voltage across either cell 12a or cell 12b is below 3.0 volts. In operation, the shift register 200 stores the results of the comparisons by comparator 162 (FIGS. 4A–4D) and shifts such results to the subsequent flip-flop at each clock cycle. Thus, the output signals of the shift register 200 are only valid after eight clock cycles have occurred, since it takes eight clock cycles to perform all of the comparisons, as described above.

Figure 7:
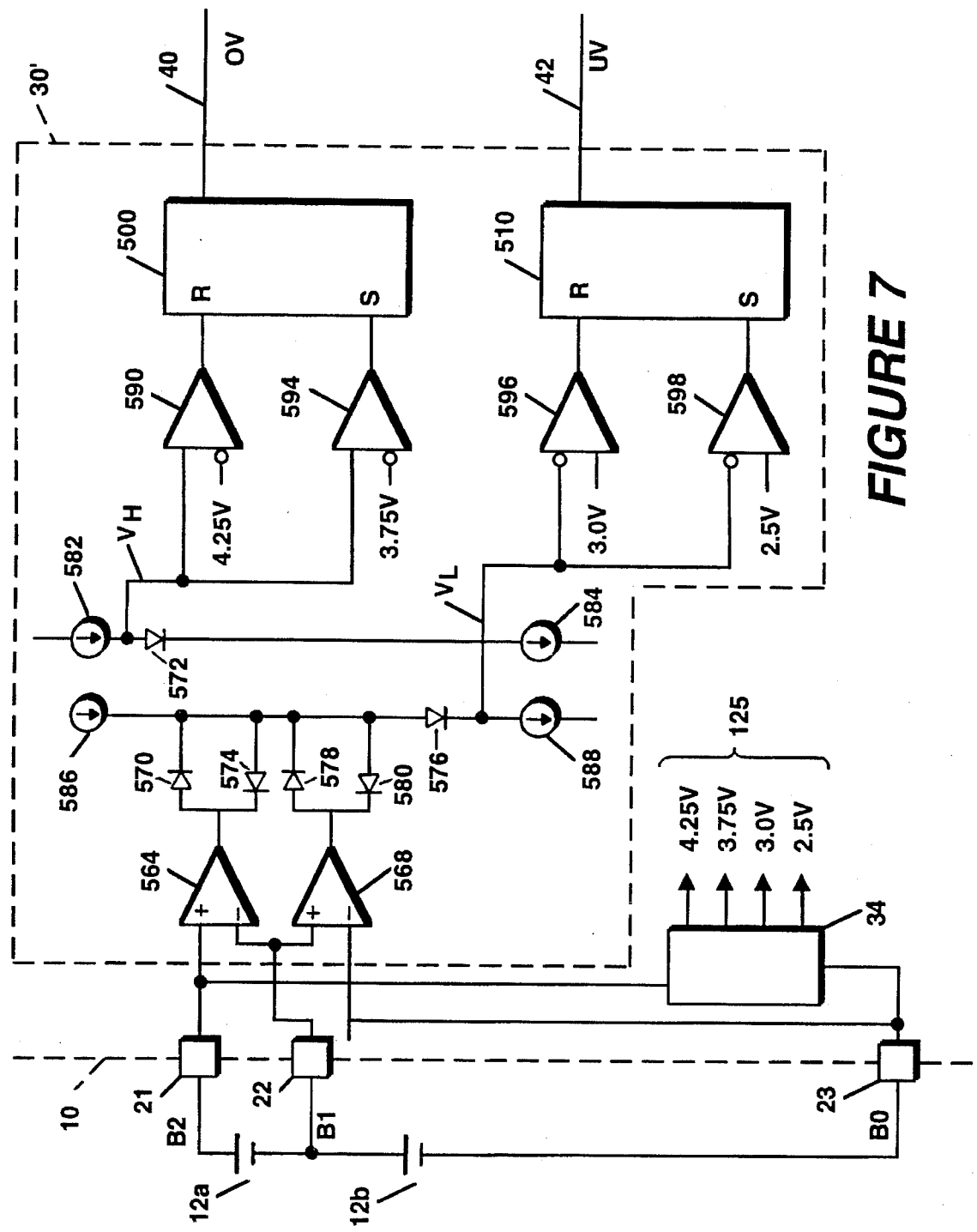
FIG. 7 is a schematic of a portion of the battery protector of FIG. 1 including an alternate embodiment of the cell voltage detection and comparison circuit.

Referring also to FIG. 7, a portion of the battery protector 10 of FIG. 1 is shown to include an alternate embodiment 30' of the cell voltage detection and comparison circuit 30 (FIG. 1). Reference voltage generator 34 is shown to generate reference voltages 125. The cell voltage detector 30' includes a plurality of differential amplifiers 564, 568, each one corresponding to one of the cells 12a, 12b and having input terminals connected to terminals of the respective cell 12a, 12b. More particularly, the first differential amplifier 564 has a non-inverting input terminal connected to the positive terminal of cell 12a at pin 21 and an inverting input terminal connected to the negative terminal of cell 12a at pin 22. Pin 22 is further connected to the non-inverting input terminal of differential amplifier 568. The inverting input terminal to differential amplifier 568 is connected to the negative terminal of cell 12b at pin 23, as shown.

The output terminal of differential amplifier 564 is connected to the anode of a first diode 570, the cathode of which is connected to a cathode of a diode 572. The output terminal of differential amplifier 564 is additionally connected to the cathode of a diode 574, the anode of which is connected to the anode of a diode 576. In a similar manner, the output of differential amplifier 568 is connected to the anode of a diode 578, the cathode of which is connected to the cathode of diode 572. The output terminal of differential amplifier 568 is further connected to the cathode of a diode 580, the anode of which is connected to the anode of diode 576. Each of diodes 572 and 576 is connected between a respective pair of current sources 582, 584 and 586, 588, as shown. The voltage at the anode of diode 572 is equal to the highest voltage across any of the cells 12a, 12b and thus, provides a high cell voltage signal $V_H$. Conversely, the voltage at the cathode of diode 576 is equal to the lowest voltage across any of the cells 12a, 12b and thus, provides a low cell voltage signal $V_L$. This arrangement for generating the high cell voltage signal $V_H$ and the low cell voltage signal $V_L$ is described in a co-pending U.S. patent application Ser. No. 08/353,620 entitled "BATTERY CHARGER/MONITOR EMPLOYING A CELL VOLTAGE SENSOR", assigned to the assignee of the present invention, and incorporated herein by reference.

The high cell voltage signal $V_H$ is applied to the non-inverting input terminal of comparators 590 and 594 which receive the first and third predetermined reference voltages of 4.25 volts and 3.75 volts at inverting terminals thereof, respectively. The low cell voltage signal $V_L$ is applied to the inverting input terminal of comparators 596 and 598, the non-inverting input terminals to which receive the fourth and second predetermined reference voltages of 3.0 volts and 2.5 volts, respectively.

The output signal of overvoltage comparator 590 sets an overvoltage latch 500. Latch 500 is reset by the output signal of overvoltage hysteresis comparator 594. With this arrangement, if the voltage across any of the cells 12a, 12b exceeds the first predetermined level of 4.25 volts, then the latch 500 is set and the overvoltage signal 40 transitions to a logic high level. The overvoltage signal 40 remains in this logic high level until the latch 500 is reset by the overvoltage hysteresis comparator 594 when the voltage across both of the cells 12a, 12b is less than the third threshold level of 3.75 volts.

Similarly, the output signal of the undervoltage comparator 598 sets an undervoltage latch 510 which is reset by the output signal of the undervoltage hysteresis comparator 596. With this arrangement, if the voltage across any of the cells falls below the second predetermined threshold of 2.5 volts, then the latch 510 is set, causing the undervoltage signal 42 to transition to a logic high level. The undervoltage signal 42 remains in the logic high level until the latch 510 is reset by the undervoltage hysteresis comparator 596 when the voltage across all of the cells 12a, 12b exceeds the fourth predetermined level of 3.0 volts.

Figure 8:
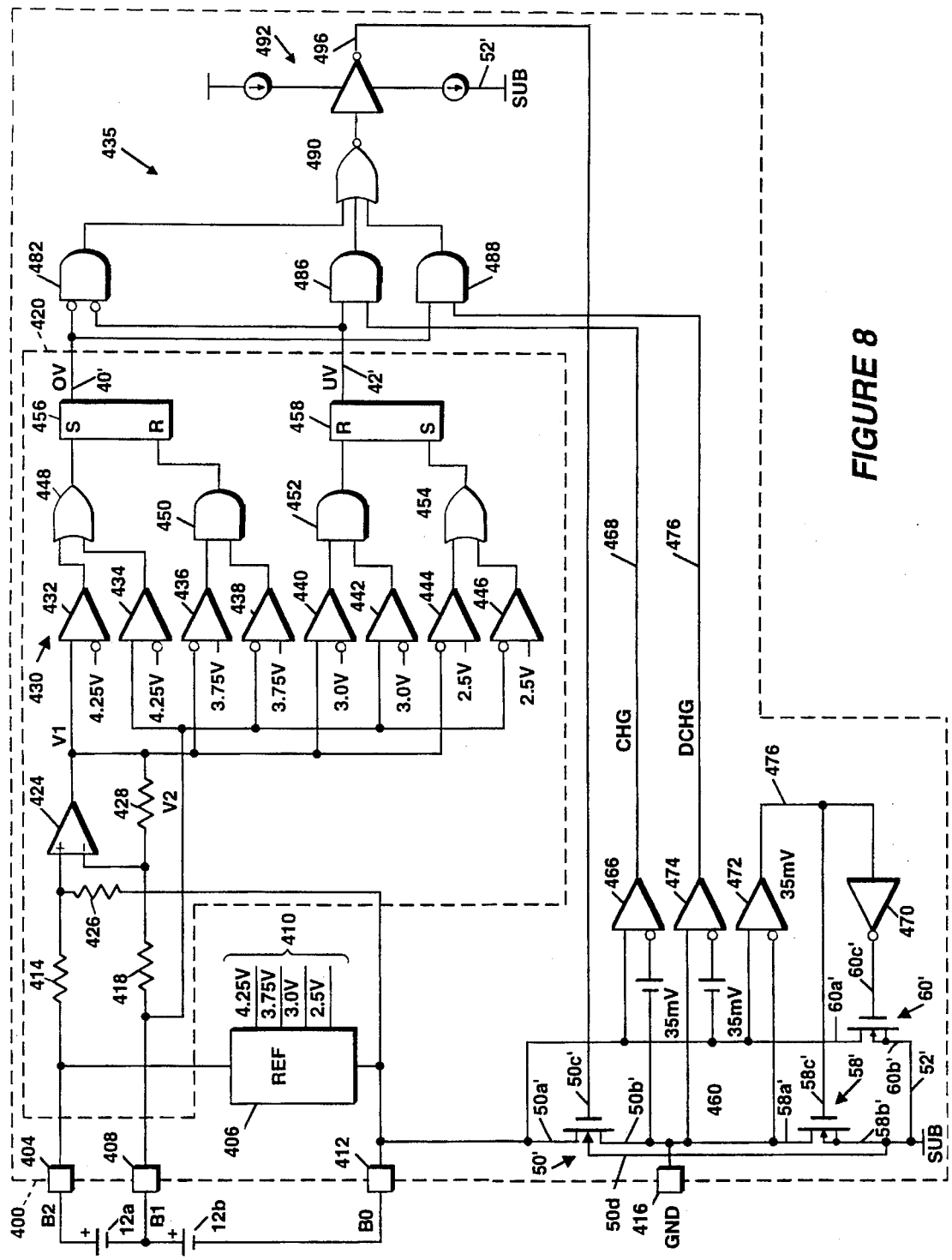
FIG. 8 is a schematic of an alternate embodiment of the battery protector of FIG. 1.

Referring to FIG. 8, an alternate embodiment 400 of the battery protector is shown to include a current carrying FET 50', identical to current carrying FET 50 of FIG. 1. The chip 400 has pins 404, 408, 412 and 416. Additional pins (not shown) may be provided in order to permit access to additional internal circuit nodes or to support additional features not shown in FIG. 8 for simplicity, such as a chip enable feature or a short circuit protection feature, etc.

Cells 12a, 12b are connected to chip pins 404, 408 and 412 and pin 412 is connected internally to pin 416 through FET 50'. Battery protector chip 400 includes a cell voltage detection and comparison circuit 420 which is responsive to the voltage across the cells 12a, 12b and to reference voltages 410 provided by a reference voltage generator 406, for generating an overvoltage signal 40' indicative of whether or not the voltage across any of the cells 12a, 12b is greater than an predetermined overvoltage level and an undervoltage signal 42' indicative of whether or not the voltage across any of the cells 12a, 12b is less than a predetermined undervoltage level.

A logic circuit 435 is coupled between the cell voltage detection and comparison circuit 420 and the gate terminal 50c' of the current carrying FET 50 for providing the gate drive signal to the FET 50'. Also provided is a bias control circuit 460 for selective connecting of the back gate terminal 50d' of the FET 50' which is formed by the chip substrate 52' to the first or second switch terminal 50a', 50b', respectively. The bias control circuit 460 includes a first bias control FET 58' and a second bias control FET 60', both of which are N-channel FETs in the illustrative embodiment. Bias control FET 58' has a drain terminal 58a' connected to the second terminal 50b' of the current carrying FET 50' and a source terminal 58b' connected to the chip substrate 52'. Bias control FET 58' additionally has a gate terminal 58c' connected to the output of a comparator 472 providing an output signal 476, as will be discussed. The second bias control FET 60' has a drain terminal 60a' connected to the first terminal 50a' of the current carrying FET 50', a source terminal 60b' connected to the chip substrate 52' and a gate terminal 60c' connected to an output terminal of an inverter 470. Inverter 470 inverts the output signal 476 of comparator 472, as shown.

The output signal of comparator 472 transitions to a logic high level to close switch 58' and open switch 60' when the voltage at current carrying FET terminal 50a' is greater than the voltage at FET terminal 50b'. Thirty-five millivolts of hysteresis is provided by comparator 472 so that, once the comparator output signal 476 is high, this signal will not transition to a logic low level until the voltage at terminal 50a' is thirty-five millivolts less than the voltage at FET terminal 50b'.

With this arrangement, the chip substrate 52' is connected to terminal 50b' when the voltage at switch terminal 50a' is greater than the voltage at switch terminal 50b'. Stated differently, switch terminal 50b' provides the source terminal of FET 50' when the voltage at terminal 50a' is greater than the voltage at terminal 50b'. Back gate terminal 50d' is connected to FET terminal 50a' which provides the source terminal of the FET 50' when the voltage at terminal 50b' is thirty-five millivolts greater than the voltage at terminal 50a'. In this way, current is prevented from flowing through the body diodes of FET 50'.

Also shown in FIG. 8 are charge and discharge comparators 466, 474 providing charge and discharge signals 468, 476, respectively, for use by the control circuit 435. Charge comparator 466 has a non-inverting input terminal connected to switch terminal 50a' and an inverting input terminal connected to switch terminal 50b' through an offset voltage, such as the illustrative thirty-five millivolt offset. Discharge comparator 474 has a non-inverting input terminal connected to switch terminal 50b' and an inverting input terminal connected to switch terminal 50a' through an offset voltage, such as the illustrative thirty-five millivolts. The charge signal 468 is at a logic high level when the charger 18 (FIG. 1) is attempting to charge the cells 12a, 12b. Conversely, the discharge signal 476 is at a logic high level if the load 20 (FIG. 1) is attempting to discharge the cells 12a, 12b.

The offset voltages at the inverting inputs of comparators 466 and 474 cause the FET 50' to be turned on and off slowly since the comparators 466, 474 operate in a linear manner to provide negative feedback, so as to maintain the thirty-five millivolt offset voltage across the FET terminals 50a', 50b'. This linear operation of comparators 466 and 474 causes the logic signal output of gates 486, 488 and 490 to "chatter" (i.e., bounce between the positive and negative supply voltage levels). An inverting buffer amplifier 492 of the logic circuit 435 effectively integrates such logic signals, thereby causing the FET 50' to be turned on and off slowly. With this arrangement, the detection of small charge and discharge currents is possible. Additionally, the slow transitioning of FET 50' reduces the amount of power spent turning the FET 50' on and off and additionally serves to prevent discontinuous load current from being presented to the load.

Logic circuit 435 is responsive to the overvoltage signal 40', the undervoltage signal 42', the charge signal 468, and the discharge signal 476, for generating the gate drive signal 496 for the current carrying FET 50'. More particularly, the logic circuit 435 includes an active low AND gate 482 (which functions as a NOR gate) receiving the undervoltage signal 42' and the overvoltage signal 40', an AND gate 486 receiving the undervoltage signal 42' and the charge signal 468 and an AND gate 488 receiving the overvoltage signal 40' and the discharge signal 476. The outputs signal of gates 482, 486 and 488 are coupled to input terminals of a NOR gate 490, the output of which is inverted by the inverting buffer amplifier 492 to provide gate drive signal 496.

With this arrangement, when neither an overvoltage nor an undervoltage condition exists (i.e., both the overvoltage signal 40 and the undervoltage signal 42 are low), the output of gate 482 is high, causing the output of gate 490 to be low and thus, the gate signal 496 to be high to close FET 50'. During an undervoltage condition, the output of AND gate 486 will be low, causing the gate drive signal 496 to also be low, unless the cells 12a, 12b are trying to charge, as indicated by a logic high charge signal 468. Similarly, during an overvoltage condition, the output of AND gate 488 will be low, causing the gate drive signal 496 to also be low, unless the cells 12a, 12b are trying to discharge as indicated by a logic high discharge signal 476.

The cell voltage detection and comparison circuit 420 utilizes level shifting principles to shift the voltage level of the "floating" cell 12a to the same reference as the voltage across cell 12b. To this end, the voltage at the positive terminal of cell 12a is connected to a first terminal of a resistor 414, the second terminal of which is connected to a non-inverting input terminal of an operational amplifier 424 and to a first terminal of a resistor 426, the second terminal of which is connected to the negative terminal of cell 12b via chip pin 412. The negative terminal of cell 12a is connected to a resistor 418 via chip pin 408, as shown. Resistor 418 is connected to the inverting input terminal of operational amplifier 424 and to a first terminal of a resistor 428. Resistor 428 is connected in a feedback relationship between the output and inverting input terminals of operational amplifier 424, as shown. The output voltage of operational amplifier 424 provides a voltage V1. The voltage at the first terminal of resistor 418 and at chip pin 408 is labelled V2.

Operational amplifier 424 generates an output voltage V1 equal to the difference between the voltage at the positive terminal of cell 12a and the negative terminal of cell 12a. Thus, the voltage V1 is a level shifted version of the voltage across cell 12a. Voltage V2, on the other hand, corresponds to the voltage across cell 12b.

Voltage detection and comparison circuit 420 includes a plurality of comparators 430 and specifically, includes overvoltage comparators 432 and 434, each receiving the first predetermined reference voltage of 4.25 volts at an inverting input terminal. Overvoltage hysteresis comparators 436 and 438 each receive the third predetermined voltage of 3.75 volts at a non-inverting input terminal. Undervoltage hysteresis comparators 440 and 442 each receive the second predetermined reference voltage of 3.0 volts at an inverting input terminal and undervoltage comparators 444 and 446 each receive the fourth predetermined reference voltage of 2.5 volts at a non-inverting input terminal. The voltage V1 is applied to the non-inverting input terminal of comparator 432, the inverting input terminal of comparator 436, the non-inverting input terminal of comparator 440 and the inverting input terminal of comparator 444. The voltage V2 is applied to the non-inverting input terminal of comparator 434, the inverting input terminal of comparator 438, the non-inverting input terminal of comparator 442 and the inverting input terminal of comparator 446, as shown.

The output signals of each pair of comparators receiving the same reference voltage are coupled to input terminals of a respective logic gate. Specifically, the output signals of comparators 432 and 434 are coupled to respective input terminals of an OR gate 448, the output signal of which sets an overvoltage latch 456. The output signals of comparators 436 and 438 are coupled to respective input terminals of an AND gate 450, the output signal of which resets the latch 456, as shown. The output of latch 456 provides the overvoltage signal 40'. The output signals of comparators 440 and 442 are coupled to respective input terminals of an AND gate 452, the output signal of which resets an undervoltage latch 458. The output signals of comparators 444 and 446 are coupled to respective input terminals of an OR gate 454, the output signal of which sets the latch 458. The output signal of latch 458 provides the undervoltage signal 42'.

In operation, if the voltage across either of cells 12a or 12b exceeds the first predetermined threshold level of 4.25 volts, then overvoltage latch 456 is set, causing the overvoltage signal 40' to transition to a logic high level. Specifically, this condition corresponds to one of the inputs to OR gate 448 being high, thereby causing the output signal of OR gate 448 to likewise be high. The overvoltage latch 456 is not reset until the voltage across both cells 12a and 12b falls below the third predetermined threshold level of 3.75 volts. That is, once this condition occurs, both input signals to AND gate 450 are high, thereby causing the output of AND gate 450 to also be high to reset latch 456 and cause the overvoltage signal 40' to go low.

When the voltage across either of the cells 12a or 12b falls below the second predetermined threshold level of 2.5 volts, the undervoltage latch 458 is set, causing the undervoltage signal 42' to go high. Specifically, in this case, one of the input signals to OR gate 454 is high, causing the output signal thereof to also be high. The latch 458 is not reset until the voltage across both of the cells 12a and 12b exceeds the fourth predetermined threshold level of 3.0 volts, at which point the output signals of comparators 440 and 442 are both high, causing the output of AND gate 452 to also be high. Once latch 458 is reset, the undervoltage signal 42' transitions to a logic low level.

Having described the preferred embodiments of the invention, it will now become apparent to one of skill in the art that other embodiments incorporating their concepts may be used. For example, it will be appreciated that the battery protectors described herein may generate one or both of the undervoltage and overvoltage signals in order to protect the cells from an undervoltage and overvoltage condition, respectively. It is felt therefore that these embodiments should not be limited to disclosed embodiments but rather should be limited only by the spirit and scope of the appended claims.

We claim:

1. A battery protection device for protecting at least one battery cell adapted for being charged by a battery charger and for delivering power to a load, said battery protection device comprising:

a voltage detection and comparison circuit having a plurality of input terminals adapted for coupling across said at least one cell and providing an overvoltage signal indicative of whether or not the voltage across one of said at least one cell is greater than an overvoltage threshold level or an undervoltage signal indicative of whether or not the voltage across said one cell is less than an undervoltage threshold level; and a current carrying FET having a first terminal adapted for connection to said at least one cell, a second terminal adapted for connection to said charger and said load, a gate terminal responsive to said overvoltage signal or said undervoltage signal, and a back gate terminal adapted for selective connection to either said first or second terminal of said current carrying FET to prevent current flow through a body diode of said current carrying FET.

2. The battery protection device recited in claim 1 wherein said voltage detection and comparison circuit provides said overvoltage signal and said undervoltage signal and said gate terminal of said current carrying FET is responsive to said overvoltage and said undervoltage signals.

3. The battery protection device recited in claim 1 wherein said battery protection device is an integrated circuit having a substrate and the anode of said body diode of said current carrying FET is provided by said substrate, and wherein said battery protector further comprises a first control switch coupled between said first terminal of said current carrying FET and said substrate and a second control switch coupled between said second terminal of said current carrying FET and said substrate.

4. The battery protection device recited in claim 3 wherein said first control switch is closed when said battery charger is attempting to charge said at least one cell and wherein said second control switch is closed when said at least one cell is attempting to discharge.

5. The battery protection device recited in claim 1 further comprising a control circuit, coupled between said voltage detection and comparison circuit and said gate terminal of said current carrying FET, said control circuit being responsive to said overvoltage signal and said undervoltage signal for controlling said current carrying FET to selectively connect and disconnect said first and second terminals of said current carrying FET.

6. The battery protection device recited in claim 5 wherein said control circuit provides a logic signal to said gate terminal of said current carrying FET in a first logic state for interconnecting said first and second terminals of said current carrying FET when (1) said overvoltage signal is not indicative of an overvoltage condition and said undervoltage signal is not indicative of an undervoltage condition; (2) said overvoltage signal is indicative of an overvoltage condition on one of said at least one cell and said at least one cell is attempting to discharge; or (3) said undervoltage signal is indicative of an undervoltage condition on said cell and said battery charger is attempting to charge said at least one cell.

7. The battery protection device recited in claim 1 wherein said device protects at least two battery cells and said voltage detection and comparison circuit comprises:
   a first multiplexer having a plurality of input terminals connected to terminals of each of said at least two cells and an output terminal to which the voltage across a selected one of said at least two cells is connected;
   a second multiplexer having a plurality of input terminals, each receiving a respective threshold voltage, and an output terminal to which a selected on e of said plurality of threshold voltages is connected; and
   a comparator circuit coupled to said output terminal of said first multiplexer and said output terminal of said second multiplexer for comparing the voltage across said selected one of said at least two cells to said selected threshold voltage.

8. The battery protection device recited in claim 1 wherein said device protects at least two battery cells and said voltage detection and comparison circuit comprises:
   a level shifter coupled to a first one of said at least two cells for shifting the voltage across said first cell to be referenced to the same potential as a second one of said at least two cells;
   a comparator circuit coupled to said level shifter for comparing said shifted voltage to a first threshold level to provide a first intermediate overvoltage signal, for comparing said voltage across said second cell to the first threshold level to provide a second intermediate overvoltage signal, for comparing said shifted voltage across said first cell to a second threshold level to provide a first intermediate undervoltage signal, and for comparing said voltage across said second cell to said second threshold level to provide a second intermediate undervoltage signal; and
   a latch circuit comprising a first latch which generates said overvoltage signal in response to said first and second intermediate overvoltage signals and maintaining the overvoltage signal in a logic state indicative of an overvoltage condition until the voltage across each of the cells is less than a third threshold level and a second latch which generates said undervoltage signal in response to said first and second intermediate undervoltage signals and maintains the undervoltage signal in a logic state indicative of an undervoltage condition until the voltage across each of said cells is greater than a fourth threshold level.

9. The battery protection device recited in claim 1 wherein said device protects at least two battery cells and said voltage detection and comparison circuit comprises:
   a plurality of differential amplifiers, each one having a pair of input terminals coupled to a terminal of a corresponding one of said at least two cells and an output terminal; and
   a network coupled to said output terminal of said plurality of differential amplifiers for providing a high cell voltage signal proportional to the highest voltage across any of said at least two cells and a low cell voltage signal proportional to the lowest voltage across any of said at least two cells.

10. The battery protection device recited in claim 9 wherein said network comprises:
   a first plurality of diodes, each one having an anode connected to said output terminal of a corresponding one of said plurality of differential amplifiers and a cathode connected to a high voltage circuit node at a voltage proportional to one diode drop below said high cell voltage signal; and
   a second plurality of diodes, each one having a cathode connected to said output terminal of a corresponding one of said plurality of differential amplifiers and an anode connected to a low voltage circuit node at a voltage proportional to one diode drop above said low cell voltage signal.

11. An integrated circuit for protecting at least one battery cell from overvoltage and undervoltage conditions, said circuit comprising:
   a four terminal FET having a first terminal adapted for coupling to said at least one cell, a second terminal adapted for coupling to a charger for charging said at least one cell and to a load powered by said at least one cell, a gate terminal, and a back gate terminal;
   a voltage detection and comparison circuit for detecting the voltage across said at least one cell to provide an overvoltage signal indicative of whether or not said voltage across one of said at least one cell is greater than an overvoltage threshold voltage and an undervoltage signal indicative of whether or not said voltage across said one cell is less than an undervoltage threshold voltage;
   a first control circuit for generating a gate drive signal for coupling to said gate terminal of said FET in response to said overvoltage signal and said undervoltage signal; and a second control circuit responsive to the voltage across said first and second terminals of said FET for generating a body control signal for selectively connecting said back gate terminal to said first terminal or to said second terminal.

12. The integrated circuit recited in claim 11 wherein said back gate terminal is formed by a substrate of said integrated circuit.

13. The integrated circuit recited in claim 12 wherein said FET conducts: when (1) said overvoltage signal is not indicative of an overvoltage condition and said undervoltage signal is not indicative of an undervoltage condition; (2) said overvoltage signal is indicative of an overvoltage condition on one of said at least one cell and said at least one cell is attempting to discharge; or (3) said undervoltage signal is indicative of an undervoltage condition on said one cell and said battery charger is attempting to charge said at least one cell.

14. The integrated circuit recited in claim 11 wherein said voltage detection and comparison circuit comprises a comparator for comparing said voltage across said at least one cell with said first threshold level to provide said overvoltage signal and for comparing said voltage across said at least one cell with said second threshold level to provide said undervoltage signal.

15. A battery protection device for protecting at least one battery cell from an overvoltage condition or an undervoltage condition, comprising:

a voltage detection and comparison circuit connected to said at least one cell for measuring the voltage across said at least one cell and providing an overvoltage signal indicative of whether or not said voltage across one of said at least one cell is greater than an overvoltage threshold level and an undervoltage signal indicative of whether or not said voltage across said one cell is less than an undervoltage threshold level;

a control circuit connected to said voltage detection and comparison circuit for generating an activation signal in response to said overvoltage signal and said undervoltage signal; and a switch having a first terminal coupled to said at least one cell, a second terminal adapted for coupled to said charger and said load, and an activation terminal responsive to said activation signal, wherein said switch is adapted for being in a closed position: (1) when said overvoltage signal is not indicative of an overvoltage condition and said undervoltage signal is not indicative of an undervoltage condition; (2) when said overvoltage signal is indicative of an overvoltage condition on one of said at least one cell and said at least one cell is attempting to discharge; or (3) when said undervoltage signal is indicative of an undervoltage condition on said one cell and said battery charger is attempting to charge said at least one cell.

16. The battery protection device recited in claim 15 wherein said switch is a FET and further comprises a fourth terminal connected to a body region of said FET, wherein said fourth terminal is selectively connectable to said first terminal or to said second terminal of said switch to prevent current form flowing through a body diode of said FET.

17. The battery protection device recited in claim 16 wherein said device protects at least two battery cells and said voltage detection and comparison circuit comprises:

a first multiplexer having a plurality of input terminals connected to terminals of each of said at least two battery cells and an output terminal to which the voltage across a selected one of said at least two cells is connected;

a second multiplexer having a plurality of input terminals, each receiving a respective threshold voltage, and an output terminal to which a selected one of said plurality of threshold voltages is connected; and a comparator circuit coupled to said output terminal of said first multiplexer and said output terminal of said second multiplexer for comparing the voltage across said selected one of said at least two cells to said selected threshold voltage.

18. The battery protection device recited in claim 15 wherein said device protects at least two battery cells and said voltage detection and comparison circuit comprises:

a level shifter coupled to a first one of said at least two battery cells for shifting the voltage across said first cell to be referenced to the same potential as a second one of said at least two battery cells;

a comparator circuit having a pair of input terminals connected to said level shifter for comparing the shifted voltage to a first threshold level to provide a first intermediate overvoltage signal, for comparing said voltage across said second cell to said first threshold level to provide a second intermediate overvoltage signal, for comparing the shifted voltage to a second threshold level to provide a first intermediate undervoltage signal, and for comparing said voltage across said second cell to said second threshold level to provide a second intermediate undervoltage signal; and a latch circuit comprising a first latch which generates said overvoltage signal in response to said first and second intermediate overvoltage signals and maintaining the overvoltage signal in a logic state indicative of an overvoltage condition until the voltage across each of the cells is less than a third threshold level and a second latch which generates said undervoltage signal in response to said first and second intermediate undervoltage signals and maintains the undervoltage signal in a logic state indicative of an undervoltage condition until the voltage across each of said cells is greater than a fourth threshold level.

19. The battery protection device recited in claim 15 wherein said device protects at least two battery cells and voltage detection and comparison circuit comprises:

a plurality of differential amplifiers, each one having a pair of input terminals coupled to a terminal of a corresponding one of said at least two cells and an output terminal; and a diode network coupled to said output terminal of said plurality of differential amplifiers for providing a high cell voltage signal proportional to the highest voltage across any of said plurality of cells and a low cell voltage signal proportional to the lowest voltage across any of said plurality of cells.

20. The battery protection device recited in claim 19 wherein said network comprises:

a first plurality of diodes, each one having an anode connected to said output terminal of a corresponding one of said plurality of differential amplifiers and a cathode connected to a high voltage circuit node at a voltage proportional to one diode drop below said high cell voltage signal; and a second plurality of diodes, each one having a cathode connected to said output terminal of a corresponding one of said plurality of differential amplifiers and an anode connected to a low voltage circuit node at a voltage proportional to one diode drop above said low cell voltage signal.

* * * * *

UNITED STATES PATENT AND TRADEMARK OFFICE
CERTIFICATE OF CORRECTION

PATENT NO. : 5,581,170
DATED : December 3, 1996
INVENTOR(S) : Robert Mammano

It is certified that error appears in the above-indentified patent and that said Letters Patent is hereby corrected as shown below:

Column 4, line 50, "schematic of", should read --schematic of part of--.

Column 9, line 23, "EN$_{13}$SF signal", should read --EN_SF signal--.

Column 10, line 12, "EN$_{13}$NF", should read --EN_NF--.

Column 14, line 44, "12ais", should read --12a is--.

Column 18, line 62, "V$_H$.and", should be --V$_H$ and--.

Column 20, line 20, "50b Back gate", should read --50b'. Back gate--.

Column 25, lines 41-42, "coupled to said charger and said load", should read --coupling to a charger and a load--.

Signed and Sealed this

Second Day of June, 1998

Attest:

BRUCE LEHMAN

*Attesting Officer*  *Commissioner of Patents and Trademarks*